United States Patent
Ishikura et al.

(10) Patent No.: US 9,215,698 B2
(45) Date of Patent: Dec. 15, 2015

(54) COMMUNICATION TERMINAL, BASE STATION, WIRELESS COMMUNICATION SYSTEM, CONTROL METHOD AND PROGRAM THEREFOR, AND RECORDING MEDIUM HAVING CONTROL PROGRAM RECORDED THEREON

(75) Inventors: Katsutoshi Ishikura, Osaka (JP); Koichi Tsunekawa, Osaka (JP); Akira Ohsima, Osaka (JP); Toshiaki Kameno, Osaka (JP); Yoshio Konno, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 114 days.

(21) Appl. No.: 13/876,661

(22) PCT Filed: Dec. 2, 2011

(86) PCT No.: PCT/JP2011/077983
§ 371 (c)(1),
(2), (4) Date: Apr. 22, 2013

(87) PCT Pub. No.: WO2012/074113
PCT Pub. Date: Jun. 7, 2012

(65) Prior Publication Data
US 2013/0208615 A1    Aug. 15, 2013

(30) Foreign Application Priority Data
Dec. 3, 2010 (JP) ................. 2010-270605

(51) Int. Cl.
*H04L 29/06* (2006.01)
*H04L 12/701* (2013.01)
(Continued)

(52) U.S. Cl.
CPC ........... *H04W 72/0406* (2013.01); *H04L 5/001* (2013.01); *H04L 5/006* (2013.01); *H04L 5/0091* (2013.01); *H04W 24/10* (2013.01); *H04W 72/085* (2013.01); *H04L 5/0023* (2013.01)

(58) Field of Classification Search
CPC ..... H04W 80/04; H04W 88/06; H04W 28/04; H04W 72/04; H04W 36/18
USPC .......................................... 370/328, 329, 331
See application file for complete search history.

(56) References Cited

U.S. PATENT DOCUMENTS

2001/0010684 A1* 8/2001 Willenegger et al. ......... 370/311
2004/0047292 A1* 3/2004 du Crest et al. ............... 370/235
(Continued)

FOREIGN PATENT DOCUMENTS

WO    WO 2010140846    * 10/2010 ............ H04W 24/10

OTHER PUBLICATIONS

"3rd Generation Partnership Project; Technical Specification Group Radio Access Network; Evolved Universal Terrestrial Radio Access (E-UTRA); Further advancements for E-UTRA physical layer aspects (Release 9)"; 3GPP TR 36.814 V9.0.0 (Mar. 2010).
(Continued)

*Primary Examiner* — Ronald B Abelson
(74) *Attorney, Agent, or Firm* — Birch, Stewart, Kolasch & Birch, LLP

(57) ABSTRACT

According to a control method of a wireless communication system in which wireless communication between a base station (12) and a communication terminal (11) is carried out by use of a plurality of discontinuous frequency bands, in a case where an onlyUL-CC having no existing corresponding DL-CC is present (S21), a communication quality of a DL-CC in a frequency band including the onlyUL-CC is measured as a communication quality of a DL-CC corresponding to the onlyUL-CC (S22) for the purpose of accurate control of the onlyUL-CC.

7 Claims, 29 Drawing Sheets

(51) Int. Cl.
*H04W 72/04* (2009.01)
*H04L 5/00* (2006.01)
*H04W 24/10* (2009.01)
*H04W 72/08* (2009.01)

(56) References Cited

U.S. PATENT DOCUMENTS

| | | | |
|---|---|---|---|
| 2007/0293230 A1* | 12/2007 | Lee | 455/450 |
| 2009/0175225 A1* | 7/2009 | Bi et al. | 370/329 |
| 2009/0209254 A1* | 8/2009 | Oguchi | 455/434 |
| 2010/0039950 A1* | 2/2010 | Kazmi | 370/252 |
| 2010/0208679 A1* | 8/2010 | Papasakellariou et al. | 370/329 |
| 2010/0231461 A1* | 9/2010 | Tran | 343/702 |
| 2011/0199945 A1* | 8/2011 | Chang et al. | 370/281 |

OTHER PUBLICATIONS

"LS on pathloss measurements in CA scenarios", 3GPP TSG RAN WG4 Meeting #55, R4-101855, May. 10-14, 2010.
"Reply LS on pathloss measurements in CA scenarios", 3GPP TSG RAN WG2 Meeting #70bis, R2-103494, Jun. 28-Jul. 2, 2010.
Huawei, "Pathloss derivation for UL PC in LTE-A", 3GPP TSG RAN WG1 meeting #61bis, R1-103441, Jun. 28-Jul. 2, 2010.
International Search Report for PCT/JP2011/077983 dated Mar. 6, 2012.
Samsung, "Path-Loss Derivation for CA", 3GPP TSG RAN WG1 #61bis, R1-103644, Jun. 28-Jul. 2010.

* cited by examiner

COMMUNICATION TERMINAL, BASE STATION, WIRELESS COMMUNICATION SYSTEM, CONTROL METHOD AND PROGRAM THEREFOR, AND RECORDING MEDIUM HAVING CONTROL PROGRAM RECORDED THEREON

CROSS REFERENCE TO RELATED APPLICATIONS

This application is the National Phase of PCT/JP2011/077983 filed on Dec. 2, 2011, which claims priority under 35 U.S.C. 119(a) to Application No. 2010-270605 filed in Japan on Dec. 3, 2010, all of which are hereby expressly incorporated by reference into the present application.

TECHNICAL FIELD

The present invention relates to (i) a wireless communication system in which wireless communication between a communication terminal and a base station is carried out by use of a plurality of frequency bands, (ii) the communication terminal and the base station of the wireless communication system, (iii) a control method and a control program each for the wireless communication system, the communication terminal, and the base station, and (iv) a storage medium in which the central program is stored.

BACKGROUND ART

3GPP (3rd Generation Partnership Project) is currently formulating specifications for an LTE (Long Term Evolution) communication system. Meanwhile, as the LTE communication system, an LTE-A (LTE-Advanced) communication system is under consideration. The LTE-A communication system is requested to (i) realize higher-speed communication than the LTE communication system and (ii) support a wider bandwidth (up to 100 MHz bandwidth) than the LTE communication system which supports a 20 MHz bandwidth.

However, it is globally difficult to reserve a wide continuous frequency bands for use in the LTE-A communication system. Further, the LTE-A communication system is requested to maintain compatibility with the LTE communication system as much as possible. In view of the circumstances, Non-Patent Literature 1 discloses a carrier aggregation (CA) technique which allows, by aggregating a plurality of carriers (component carriers; CCs) whose bandwidth is not more than 20 MHz, (i) reservation of a bandwidth of at a maximum 100 MHz and (ii) realization of high-speed and large capacity communication.

For the aforementioned CA technique, detailed specifications for signaling, channel arrangement, mapping, and the like are under consideration. A Down Link-component carrier set (DL-CC set) is defined as a CC for use in communication using the CA technique. The DL-CC set refers to a UE (User Equipment) specific DL-CC for use in communication. A base station specifies, for each user, one or more DL-CCs for use in communication.

Communication control such as a handover of a UL (Up Link)-CC and a DL-CC is carried out in accordance with a quality (wireless propagation quality, communication quality) of a wireless propagation path via which communication is being carried out. Generally, the wireless propagation quality is assessed by monitoring a DL-CC (DL-CC set) which is being used in communication.

For example, Non-Patent Literature 2 uses, in transmission power control of a UL-CC, a DL-CC (paired with the UL-CC) as a reference for a path loss which DL-CC is indicated by SIB2 (System Information Block2) included in notification information. Note that it is necessary to correct the path loss, in a case where the UL-CC and the DL-CC which is used as the reference are respectively in different bands. This is because in such a case, the path loss of the UL-CC largely differs from the path loss of the DL-CC.

CITATION LIST

Non-Patent Literatures

Non-Patent Literature 1
"Evolved Universal Terrestrial Radio Access (E-UTRA); Further advancements for E-UTRA physical layer aspects (Release 9)", 3GPP TR (Technical Report) 36.814 V9.0.0 (2010-03), Mar. 18, 2010

Non-Patent Literature 2
"Pathloss derivation for UL PC in LTE-A", 3GPP TSG RAN WG1 Meeting #61bis, R1-103441, Jun. 28-Jul. 2, 2010

SUMMARY OF INVENTION

Technical Problem

As described earlier, communication control such as UL-CC transmission control and handover control are commonly carried out by use of a DL-CC which is paired with a UL-CC. However, according to the CA technique, in a case where UL data is larger in volume than DL data, communication is carried out by use of UL-CCs which are larger in number than DL-CCs. Therefore, there possibly occurs a case where a UL-CC that has no corresponding DL-CC is used. There also possibly occurs a case where a UL-CC used for communication differs from a DL-CC in a DL-CC set in frequency band or in base station with which to communicate. In this case, it is unclear which DL-CC is to be used for calculation of a path loss and assessment of a wireless propagation quality. In the following description, such a UL-CC is referred to as an onlyUL-CC.

Further, in case of an onlyUL-CC, it is impossible to carry out accurate assessment due to a difference in frequency band, communication base station, and/or the like even by use of a DL-CC (DL-CC in a DL-CC set) which is being used for communication. It is currently unclear how to add a UL-CC, how to carry out handover control, and how to carry out transmission control in a case where such an onlyUL-CC is used. This requires consideration of how to control a UL-CC in such a case.

As described earlier, a problem caused by failure to carry out accurate assessment is exemplified by the following problem. Assume, for example, a case where a communication terminal moves away from a base station. In such a case, because a radio wave from the communication terminal to the base station accordingly decreases in intensity, the base station becomes incapable of controlling a UL-CC. Accordingly, even if the communication terminal continues uplink transmission, the communication terminal cannot possibly receive feedback from the base station. Consequently, the communication terminal continues useless transmission.

Further, as to handover control, in a case where there exists a DL to be paired with a UL, it is possible to carry out handover control in accordance with a quality of the DL. However, in case of an onlyUL-CC which has no corresponding DL-CC, it is impossible to carry out flexible control.

The present invention has been made in view of the above problems, and an object of the present invention is to mainly provide a wireless communication system which (i) allows accurate assessment of a wireless propagation quality of a UL-CC (onlyUL-CC) which has no corresponding DL-CC and (ii) also allows accurate control of uplink transmission by use of the onlyUL-CC.

Solution to Problem

In order to solve the above problems, a wireless communication system of the present invention in which wireless communication between a base station and a communication terminal is carried out by use of a plurality of frequency bands is configured such that: the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station; the base station includes band allocation means that allocates, to the communication terminal, the downlink sub-band and the uplink sub-band in the plurality of frequency bands; the communication terminal includes quality measurement means that measures a communication quality of the downlink sub-band that has been allocated by the band allocation means of the base station; the base station includes communication control determination means that determines, in accordance with the communication quality of the downlink sub-band, communication control of the uplink sub-band that has been allocated by the band allocation means of the base station, the communication quality having been measured by the quality measurement means of the communication terminal, the uplink sub-band that has been allocated corresponding to the downlink sub-band that has been allocated; the communication terminal includes communication control means that carries out, in accordance with the communication control of the uplink sub-band that has been allocated, the uplink transmission in the uplink sub-band that has been allocated, the communication control having been determined by the communication control determination means of the base station; and in a case where there exists a frequency band that includes (i) the uplink sub-band having been allocated to the communication terminal by the band allocation means of the base station but (ii) no downlink sub-band that has been allocated to the communication terminal by the band allocation means of the base station, (a) the quality measurement means of the communication terminal further measures, as a communication quality of a monitor downlink sub-band, a communication quality of a downlink sub-band that has not been allocated in the frequency band of the case, and (b) the communication control determination means of the base station determines, in accordance with the communication quality of the monitor downlink sub-band, communication control of an only-uplink sub-band that is the uplink sub-band that has been allocated in the frequency band of the case, the communication quality having been measured by the quality measurement means of the communication terminal.

In order to solve the above problems, a control method of a wireless communication system in which wireless communication between a base station and a communication terminal is carried out by use of a plurality of frequency bands and the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station, the method of the present invention includes the steps of: (a) the base station allocating, to the communication terminal, the downlink sub-band and the uplink sub-band in the plurality of frequency bands; (b) the communication terminal measuring a communication quality of the downlink sub-band that has been allocated to the communication terminal in the step (a); (c) the base station determining, in accordance with the communication quality of the downlink sub-band, communication control of the uplink sub-band that has been allocated in the step (a), the communication quality having been measured in the step (b), the uplink sub-band that has been allocated corresponding to the downlink sub-band that has been allocated; (d) the communication terminal carrying out, in accordance with the communication control of the uplink sub-band that has been allocated, the uplink transmission in the uplink sub-band that has been allocated, the communication control having been determined in the step (c); and in a case where there exists a frequency band that includes (i) the uplink sub-band having been allocated to the communication terminal in the step (a) but (ii) no downlink sub-band that has been allocated to the communication terminal in the step (a), the step (b) including the sub-step of further measuring, as a communication quality of a monitor downlink sub-band, a communication quality of a downlink sub-band that has not been allocated in the frequency band of the case, and the step (c) including the sub-step of determining, in accordance with the communication quality of the monitor downlink sub-band, communication control of an only-uplink sub-band that is the uplink sub-band that has been allocated in the frequency band of the case, the communication quality having been measured in the step (b).

Here, examples of the communication control of the uplink sub-band encompass (i) transmission control for carrying out uplink transmission, (ii) transmission stop control for stopping the uplink transmission or shifting to an inactive state in which the uplink sub-band cannot be used, (iii) transmission restart control for restarting the uplink transmission or shifting back to an active state in which the uplink sub-band can be used, and (iv) handover control for shifting to uplink transmission directed to another base station.

Meanwhile, examples of the communication quality of the downlink sub-band are a reception level and a transmission loss (path loss) that are relevant to a signal of the downlink sub-band. Further, the reception level includes a data reception level, a reference signal reception level, and the like. In addition, the communication terminal (i) receives, from the base station, information on transmission power of the signal of the downlink sub-band and (ii) measures a reception level of the signal of the downlink sub-band, so that the transmission loss can be obtained.

According to the above configuration and method, the base station allocates, to a communication terminal, a downlink sub-band and an uplink sub-band in a plurality of frequency bands. Then, the communication terminal measures a communication quality of the downlink sub-band that has been allocated. Then, the base station determines, in accordance with thus measured communication quality of the downlink sub-band that has been allocated, communication control of the uplink sub-band that has been allocated which uplink sub-band corresponds to the downlink sub-band that has been allocated. Then, the communication terminal carries out, in accordance with thus determined communication control of the uplink sub-band that has been allocated, uplink transmission by use of the uplink sub-band that has been allocated.

At this time, in a case where there exists a frequency band that includes the uplink sub-band that has been allocated to the communication terminal but no downlink sub-band that has been allocated to the communication terminal, the communication terminal further measures a communication quality of such a non-allocated downlink sub-band in the frequency band as a communication quality of a monitor downlink sub-band. Then, the base station determines, in accordance with thus measured communication quality of the monitor downlink sub-band, communication control of an only-uplink sub-band that is the uplink sub-band that has been allocated in the frequency band.

Accordingly, a communication quality of a non-allocated downlink sub-band that is in the same frequency band as the only-uplink sub-band (onlyUL-CC) is measured as a communication quality of a monitor downlink sub-band. Therefore, the communication quality of the only-uplink sub-band can be assessed with accuracy. Further, because communication control of the only-uplink sub-band is determined in accordance with the communication quality of the monitor downlink sub-band, the communication terminal can control the uplink transmission in the only-uplink sub-band with accuracy.

Note that the base station may allocate, to the communication terminal, a plurality of such downlink sub-bands as a set. In this case, the set can include downlink sub-bands in different frequencies. Similarly, the base station may allocate a plurality of such uplink sub-bands to the communication terminal.

In order to solve the above problems, a wireless communication system of the present invention in which wireless communication between a base station and a communication terminal is carried out by use of a plurality of frequency bands is configured such that: the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station; the base station includes band allocation means that allocates, to the communication terminal, the downlink sub-band and the uplink sub-band in the plurality of frequency bands; the communication terminal includes quality measurement means that measures a communication quality of the downlink sub-band that has been allocated by the band allocation means of the base station; the base station includes communication control determination means that determines, in accordance with the communication quality of the downlink sub-band, communication control of the uplink sub-band that has been allocated by the band allocation means of the base station, the communication quality having been measured by the quality measurement means of the communication terminal, the uplink sub-band that has been allocated corresponding to the downlink sub-band that has been allocated; the communication terminal includes communication control means that controls, in accordance with the communication control of the uplink sub-band that has been allocated, the uplink transmission in the uplink sub-band that has been allocated, the communication control having been determined by the communication control determination means of the base station; the base station includes quality measurement means that (i) measures a reception power in the uplink sub-band and (ii) obtains a communication quality of the uplink sub-band from the reception power thus measured; and in a case where there exists a frequency band that includes (i) the uplink sub-band having been allocated to the communication terminal by the band allocation means of the base station but (ii) no downlink sub-band that has been allocated to the communication terminal by the band allocation means of the base station, the communication control determination means of the base station determines, in accordance with the communication quality having been obtained by the quality measurement means, communication control of an only-uplink sub-band that is the uplink sub-band in the frequency band of the case.

In order to solve the above problems, a control method of a wireless communication system in which wireless communication between a base station and a communication terminal is carried out by use of a plurality of frequency bands and the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station, the method of the present invention includes the steps of: (a) the base station allocating, to the communication terminal, the downlink sub-band and the uplink sub-band in the plurality of frequency bands; (b) the communication terminal measuring a communication quality of the downlink sub-band that has been allocated to the communication terminal in the step (a); (c) the base station determining, in accordance with the communication quality of the downlink sub-band, communication control of the uplink sub-band that has been allocated in the step (a), the communication quality having been measured in the step (b), the uplink sub-band that has been allocated corresponding to the downlink sub-band that has been allocated; (d) the communication terminal controlling, in accordance with the communication control of the uplink sub-band that has been allocated, the uplink transmission in the uplink sub-band that has been allocated, the communication control having been determined in the step (c); (e) the base station (i) measuring a reception power in the uplink sub-band and (ii) obtaining a communication quality of the uplink sub-band from the reception power thus measured; and in a case where there exists a frequency band that includes (i) the uplink sub-band having been allocated to the communication terminal in the step (a) but (ii) no downlink sub-band that has been allocated to the communication terminal in the step (a), the step (d) including the sub-step of determining, in accordance with the communication quality having been obtained in the step (e), communication control of an only-uplink sub-band that is the uplink sub-band in the frequency band of the case.

According to the above configuration and method, the base station allocates, to a communication terminal, a downlink sub-band and an uplink sub-band in a plurality of frequency bands. Then, the communication terminal measures a communication quality of the downlink sub-band that has been allocated. Then, the base station determines, in accordance with thus measured communication quality of the downlink sub-band that has been allocated, communication control of the uplink sub-band that has been allocated which uplink sub-band corresponds to the downlink sub-band that has been allocated. Then, the communication terminal carries out, in accordance with thus determined communication control of the uplink sub-band that has been allocated, uplink transmission by use of the uplink sub-band that has been allocated.

At this time, in a case where there exists a frequency band that includes the uplink sub-band that has been allocated to the communication terminal but no downlink sub-band that has been allocated to the communication terminal, the base station (i) measures a reception power of an only-uplink sub-band that is the uplink sub-band that has been allocated in the frequency band and (ii) obtains a communication quality from thus measured reception power. Then, the base station determines communication control of the only-uplink sub-band, in accordance with thus obtained communication quality.

Accordingly, because the base station directly assesses the communication quality of the only-status uplink sub-band (onlyUL-CC), accurate assessment of the communication quality is possible. Further, because communication control of the only-uplink sub-band is determined in accordance with the communication quality of the only-uplink sub-band, the communication terminal can control with accuracy the uplink transmission in the only-uplink sub-band.

In order to solve the above problems, a wireless communication system of the present invention in which wireless communication between a base station and a communication terminal is carried out by use of a plurality of frequency bands, is configured such that: the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station; the base station includes band allocation means that allocates, to the communication terminal, the downlink sub-band and the uplink sub-band in the plurality of frequency bands; the communication terminal includes quality measurement means that measures a communication quality of the downlink sub-band that has been allocated by the band allocation means of the base station; the base station includes communication control determination means that determines, in accordance with the communication quality of the downlink sub-band, communication control of the uplink sub-band that has been allocated by the band allocation means of the base station, the communication quality having been measured by the quality measurement means of the communication terminal, the uplink sub-band that has been allocated corresponding to the downlink sub-band that has been allocated; the communication terminal includes communication control means that controls, in accordance with the communication control of the uplink sub-band that has been allocated, the uplink transmission in the uplink sub-band that has been allocated, the communication control having been determined by the communication control determination means of the base station; and in a case where there exists a frequency band that includes (i) the uplink sub-band which the band allocation means of the base station is required to allocate to the communication terminal and (ii) the downlink sub-band which the band allocation means of the base station is not required to allocate to the communication terminal, the band allocation means of the base station allocates, to the communication terminal, the downlink sub-band in the frequency band of the case as a downlink sub-band for measuring the communication quality.

In order to solve the above problem, a control method of a wireless communication system in which wireless communication between a base station and a communication terminal is carried out by use of a plurality of frequency bands and the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station, the method of the present invention includes the steps of: (a) the base station allocating, to the communication terminal, the downlink sub-band and the uplink sub-band in the plurality of frequency bands; (b) the communication terminal measuring a communication quality of the downlink sub-band that has been allocated to the communication terminal in the step (a); (c) the base station determining, in accordance with the communication quality of the downlink sub-band, communication control of the uplink sub-band that has been allocated in the step (a), the communication quality having been measured in the step (b), the uplink sub-band that has been allocated corresponding to the downlink sub-band that has been allocated; (d) the communication terminal controlling, in accordance with the communication control of the uplink sub-band that has been allocated, the uplink transmission in the uplink sub-band that has been allocated, the communication control having been determined in the step (c); in a case where there exists a frequency band that includes (i) the uplink sub-band that needs to be allocated to the communication terminal in the step (a) and (ii) the downlink sub-band that does not need to be allocated to the communication terminal in the step (a), the step (a) allocating, to the communication terminal, the downlink sub-band in the frequency band of the case as a downlink sub-band for measuring the communication quality.

According to the above configuration and method, the base station allocates, to a communication terminal, a downlink sub-band and an uplink sub-band in a plurality of frequency bands. Then, the communication terminal measures a communication quality of the downlink sub-band that has been allocated. Then, the base station determines, in accordance with thus measured communication quality of the downlink sub-band that has been allocated, communication control of the uplink sub-band that has been allocated which uplink sub-band corresponds to the downlink sub-band that has been allocated. Then, the communication terminal carries out, in accordance with thus determined communication control of the uplink sub-band that has been allocated, uplink transmission by use of the uplink sub-band that has been allocated.

At this time, in a case where there exists a frequency band that includes the uplink sub-band that needs to be allocated to the communication terminal and the downlink sub-band that does not need to be allocated, the base station allocates, to the communication terminal, the downlink sub-band in the frequency band as a downlink sub-band for measurement of the communication quality.

Accordingly, a frequency band including an uplink sub-band that has been allocated always includes a downlink sub-band whose communication quality is to be measured. Therefore, the presence of the above-described only-uplink sub-band is eliminated. As a result, the base station can assess with accuracy a communication quality of the uplink sub-band that has been allocated and thereby can control with accuracy the uplink transmission in the uplink sub-band.

Advantageous Effects of Invention

As described above, in the wireless communication system of the present invention, a communication quality of a non-allocated downlink sub-band that is in the same frequency band as the only-uplink sub-band is measured as a communication quality of a monitor downlink sub-band. Therefore, the communication quality of the only-uplink sub-band can be accessed with accuracy. This makes it possible to control with accuracy uplink transmission in the only-uplink sub-band.

Further, in the wireless communication system of the present invention, because the base station directly obtains a communication quality of the only-uplink sub-band from a reception power in the only-uplink sub-band which reception power has been measured by the base station. This makes it possible to assess with accuracy the communication quality. As a result, it becomes possible to control with accuracy uplink transmission in the only-uplink sub-band.

Further, in the wireless communication system of the present invention, a non-allocated downlink sub-band in a frequency band including the only-uplink sub-band is further allocated to the communication terminal. Therefore, the presence of the only-uplink sub-band is eliminated. As a result, it becomes possible to prevent deterioration in accuracy of communication control with respect to the only-uplink sub-band.

BRIEF DESCRIPTION OF DRAWINGS

FIG. 1 is a schematic view of a wireless communication system of one embodiment of the present invention.

FIG. 2 is a block diagram schematically illustrating a configuration of the wireless communication system.

FIG. 3 is a block diagram schematically illustrating a configuration of a terminal in the wireless communication system.

FIG. 4 is a block diagram schematically illustrating a configuration of a base station of the wireless communication system.

FIG. 5 is a sequence diagram showing an example of how the terminal and the base station operate in CA connection in the wireless communication system.

FIG. 6 is a flowchart showing how a process for determining a CA set is carried out in the CA connection.

FIG. 7 is a sequence diagram showing an example of how the terminal and the base station operate during onlyUL-CC transmission control in the wireless communication system.

FIG. 8 is a flowchart showing how a process for quality measurement corresponding to an onlyUL-CC is carried out in the transmission control.

FIG. 9 is a sequence diagram showing another example of how the terminal and the base station operate during the onlyUL-CC transmission control.

FIG. 10 is a flowchart showing how a process for quality measurement corresponding to an onlyUL-CC is carried out in the transmission control.

FIG. 11 is a sequence diagram showing an example of how the terminal and the base station operate in onlyUL-CC handover control in the wireless communication system.

FIG. 12 is a flowchart showing how a process for quality measurement corresponding to an onlyUL-CC is carried out in the handover control.

FIG. 13 is a sequence diagram showing another example of how the terminal and the base station operate in the onlyUL-CC handover control.

FIG. 14 is a flowchart showing how a process for quality measurement corresponding to an onlyUL-CC is carried out in the handover control.

FIG. 15 is a sequence diagram showing still another example of how the terminal and the base station operate in the onlyUL-CC handover control.

FIG. 16 is a flowchart showing an example of a process for changing a threshold for determining whether or not to carry out a handover.

FIG. 17 is a schematic view illustrating a case where a UL-CC becomes an onlyUL-CC during communication in the wireless communication system.

FIG. 18 is a sequence diagram showing an example of how the terminal and the base station operate in the above case.

FIG. 19 is a schematic view of a wireless communication system of another embodiment of the present invention.

FIG. 20 is a block diagram schematically illustrating a configuration of a terminal in the wireless communication system.

FIG. 21 is a block diagram schematically illustrating a configuration of a base station in the wireless communication system.

FIG. 22 is a sequence diagram showing an example of how the terminal and the base station operate during onlyUL-CC transmission control in the wireless communication system.

FIG. 23 is a flowchart showing how a process at the terminal for quality measurement corresponding to an onlyUL-CC is carried out in the onlyUL-CC transmission control.

FIG. 24 is a flowchart showing how a process at the base station for quality measurement corresponding to an onlyUL-CC is carried out.

FIG. 25 is a sequence diagram showing an example of how the terminal and the base station operate in the onlyUL-CC handover control in the wireless communication system.

FIG. 26 is a flowchart showing how a process at the terminal for quality measurement corresponding to an onlyUL-CC is carried out in the onlyUL-CC handover control.

FIG. 27 is a schematic view of a wireless communication system of still another embodiment of the present invention.

FIG. 28 is a flowchart showing an example of how a process for determining a CA set is carried out in the wireless communication system.

FIG. 29 is a flowchart showing another example of how a process for determining a CA set is carried out.

DESCRIPTION OF EMBODIMENTS

[Embodiment 1]

The following discusses an embodiment of the present invention with reference to FIGS. 1 to 18.

Figure 1:
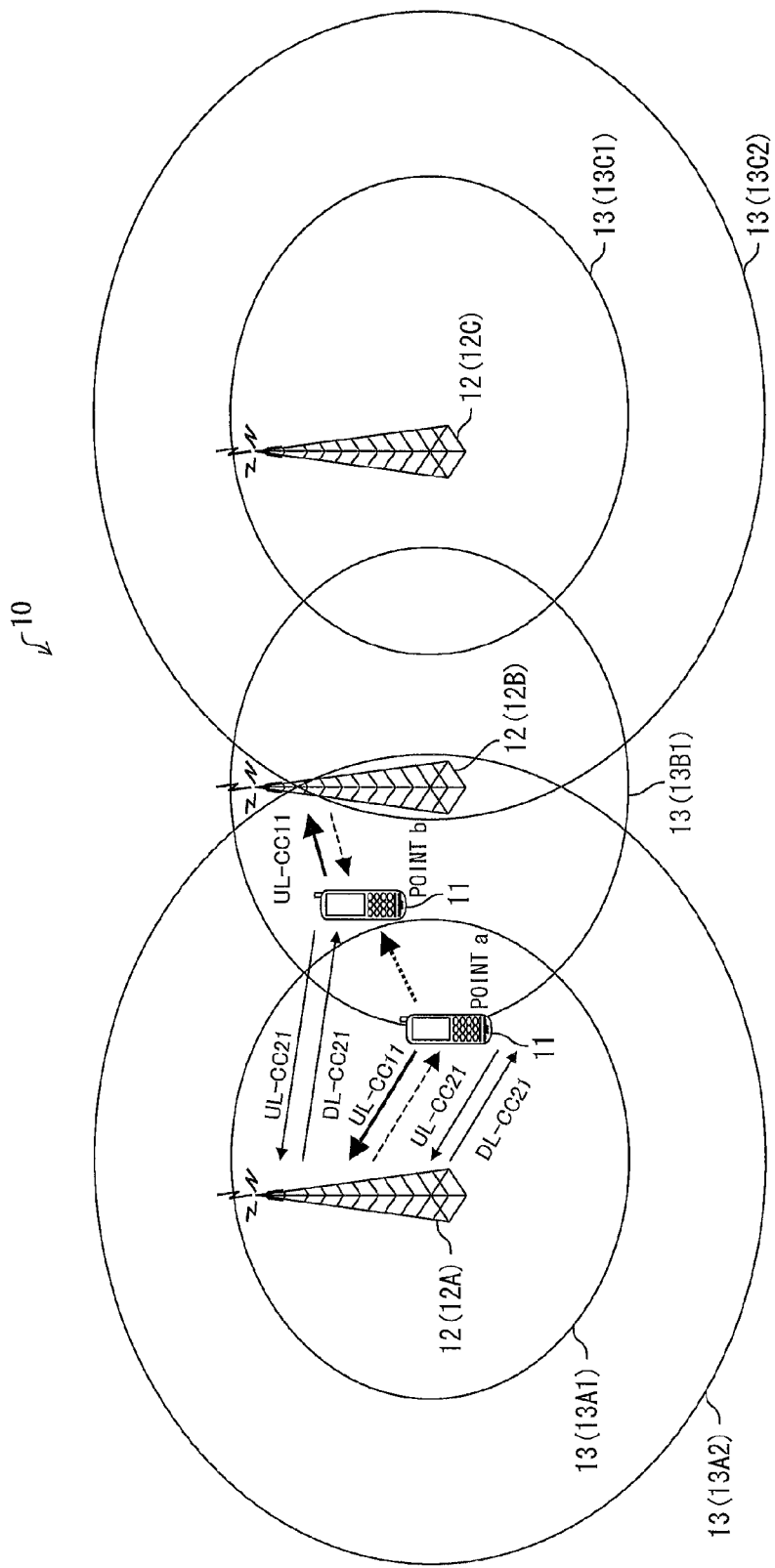
FIG. 1

FIG. 1 is a schematic view of a wireless communication system of Embodiment 1. FIG. 1 illustrates a wireless communication system 10 which includes a wireless communication terminal (hereinafter, abbreviated to a "terminal") 11 and base stations 12A to 12C each of which communicates wirelessly with the wireless communication terminal 11. Note that, hereinafter, in a case where the base stations 12A to 12C are to be collectively referred to, the term "base station 12" is used.

In Embodiment 1, two frequency bands (hereinafter, abbreviated to "bands") FB1 and FB2 are used for the above wireless communication. As illustrated in FIG. 1, the base station 12A uses the bands FB1 and FB2, the base station 12B uses the band FB1 and the base station 12C uses the bands FB1 and FB2.

FIG. 1 also illustrates (i) a cell 13A1 that is an area where the base station 12A can communicate by use of the band FB1 and a cell 13A2 that is an area where the base station 12A can communicate by use of the band FB2, (ii) a cell 13B1 that is an area where the base station 12B can communicate by use of the band FB1, and (iii) a cell 13C1 that is an area where the base station 12C can communicate by use of the band FB1 and a cell 13C2 that is an area where the base station 12C can communicate by use of the band FB2. Note that, hereinafter, in a case where the cells 13A1, 13A2, 13B1, 13C1 and 13C2 are to be collectively referred to, the term "cell 13" is used.

The base station 12A carries out transmission to the terminal 11 by use of a plurality of DL-CCs (downlink sub-bands) in the bands FB1 and FB2, while the terminal 11 carries out transmission to the base station 12A by use of a plurality of UL-CCs (uplink sub-bands) in the bands FB1 and FB2. The same applies to the base station 12C. Meanwhile, the base station 12B carries out transmission to the terminal 11 by use of a plurality of DL-CCs (uplink sub-bands) in the band FB1 while the terminal 11 carries out transmission to the base station 12C by use of a plurality of UL-CCs in the band FB1.

In Embodiment 1, because an FDD (Frequency Division Duplex) communication system is employed, different frequencies are used respectively for a DL and a UL. Further, the bands FB1 and FB2 are frequency bands that nations independently allocate for mobile communication systems. In case of Japan, the bands FB1 and FB2 are a 2 G Hz band (where frequencies in a range of 1920 MHz to 1980 MHz are allocated to a UL and frequencies in a range of 2110 MHz to 2170 MHz are allocated to a DL) and a 800 MHz band (where frequencies in a range of 824 MHz to 849 MHz are allocated to a LJL and frequencies in a range of 869 MHz to 894 MHz are allocated to a DL), for example. Note that other communication system may also be employed.

FIG. 1 illustrates a state where the terminal 11 moves from a point a to a point b and communication by use of CCs in the band FB1 is handed over from the base station 12A to the base station 12B. In FIG. 1, the terminal 11 is carrying out communication in which UL data is larger in volume than DL data as in case of, for example, uploading. As illustrated in FIG. 1, at the point a, the terminal 11 carries out communication by use of one DL-CC (DL-CC 21) in the band FB2 of the base station 12A in regard to DL and two UL-CCs including a UL-CC (UL-CC 21) in the band FB2 of the base station 12A and a UL-CC (UL-CC 11) in the band FB1 of the base station 12A. In other words, a DL-CC set includes only the DL-CC 21 while a UL-CC set includes the two UL-CCs that are the UL-CC 21 and the UL-CC 11.

In the example illustrated in FIG. 1, there is only one UL-CC 11 as a CC in the band FB1. This means that the UL-CC is present in a band where no DL-CC in the DL-CC set is present. In this case, because the bands FB1 and FB2 differ from each other in wireless propagation characteristic, it is difficult to accurately control such UL-CC 11 by use of the DL-CC 21 whose band is different from that of the UL-CC 11, that is, whose communication quality is significantly different from that of the UL-CC 11.

As described above, in a case where there presents a UL-CC that is different in wireless propagation characteristic (band) from all DL-CCs in a DL-CC set, this UL-CC is called an onlyUL-CC (an only-uplink sub-band). Note that even a UL-CC that is different in cell (base station 12) from all DL-CCs in a DL-CC set is similarly called an onlyUL-CC as in case of a UL-CC that is different in band from all DL-CCs in a DL-CC set. This is because such a UL-CC has a different quality from those of the DL-CCs.

In Embodiment 1, regardless of the wireless propagation characteristic, transmission control of a UL-CC, whose corresponding DL-CC for monitoring is indicated by the base station 12, can be carried out in the same manner as all transmission controls of onlyUL-CCs described later.

At the point a in FIG. 1, as in general cases, the transmission control of the UL-CC 21 is carried out in accordance with a quality of the DL-CC 21 in the band FB2 where both the UL-CC 21 and the DL-CC 21 are present. However, because the UL-CC 11 is an onlyUL-CC, a DL-CC corresponding to the UL-CC 11 is monitored so that a quality of the onlyUL-CC is secured. This leads to accurate transmission control of the UL-CC 1 1. In FIG. 1, a broken line arrow indicates a DL-CC for monitoring.

Note that for example, a linkage between a DL-CC and an UL-CC (Cell Specific Linkage) (that is notified in notification information) that is predetermined in the wireless communication system 10 may be used for associating the UL-CC 11 with a DL-CC. Further, in a case where a terminal-specific linkage between a DL-CC and an UL-CC (UE Specific Linkage) has been notified via a communication network, this terminal-specific linkage can be used for associating the UL-CC 11 with a DL-CC. In this case, it is required that the above terminal-specific linkage (UE Specific Linkage) is configured within one cell and within one band.

Further, in associating the UL-CC 11 with a DL-CC, the UL-CC 11 can be associated with any DL-CC, simply as long as this DL-CC is within the same cell and within the same band as the onlyUL-CC. This is because it is only necessary to monitor a DL-CC that has a similar wireless propagation characteristic to that of the UL-CC 11. In any case, for the association of the UL-CC 11 with a DL-CC, the base station 12 selects a DL-CC for the association and notifies thus selected DL-CC to the terminal 11.

Next, as illustrated in FIG. 1, the terminal 11 moves from the point a to the point b. At this time, deterioration occurs in quality level of a DL-CC (in the band FB1) that corresponds to the UL-CC 11 of the monitoring base station 12A, whereas improvement occurs in quality level of a DL-CC (in the band FB1) that corresponds to the UL-CC 11 of the base station 12B. Then, at the point b, a handover of the UL-CC 11 from the base station 12A to the base station 12B is carried out. Note that the terminal 11 may monitor the handover at a timing when an instruction from the base station 12 is received, or alternatively may monitor the handover periodically or constantly.

The handover of the UL-CC 11 is carried out in response to an instruction to carry out the handover which instruction is provided from the base station 12. When the instruction is given, a parameter (e.g., transmission signal setting for the base station 12B) for the handover are notified. Then, the terminal 11 sets the parameter and carries out the handover. In a case where no change in transmission setting and the like of the terminal 11 is not especially required at the time when the handover is carried out, the base station 12 is not required to transmit, to the terminal 11, any instruction to carry out such a handover. In this case, the handover can be carried out by only the base station 12. That is, it is only necessary that the onlyUL-CC of the base station 12A is switched to the onlyUL-CC of the base station 12B on the communications network.

As described above, regarding the onlyUL-CC, accurate transmission control of the onlyUL-CC becomes possible not by using a DL-CC in a DL-CC set which DL-CC has a different quality from that of the onlyUL-CC but by monitoring a DL-CC that has a substantially same quality as the onlyUL-CC and that is within the same cell and within the same band as this onlyUL-CC. The following discusses in detail a configuration and a control method.

Figure 2:
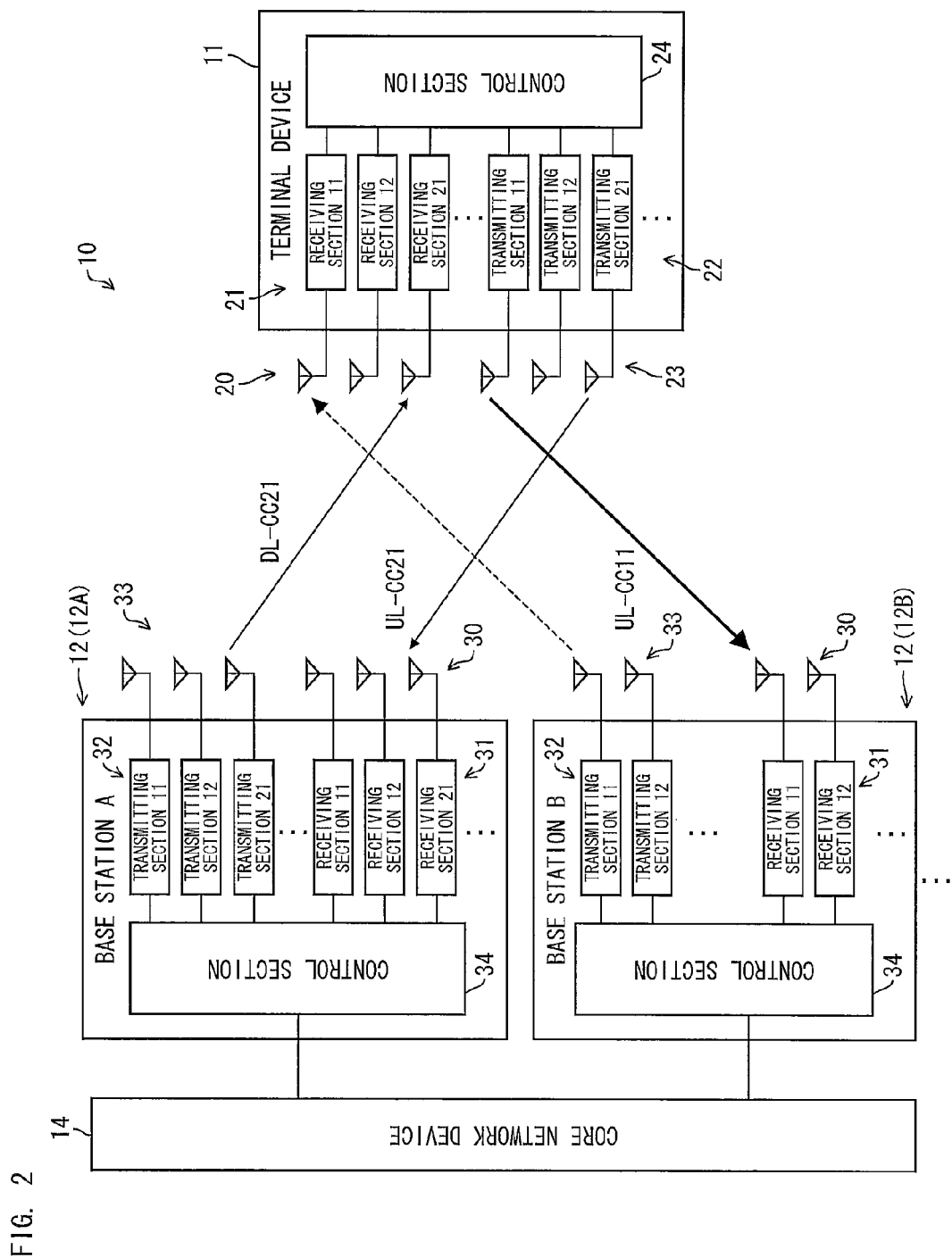
FIG. 2

FIG. 2 is a block diagram schematically illustrating the wireless communication system 10 of Embodiment 1. FIG. 2 illustrates a case where the terminal 11 is at the point b. Respective configurations of the base station 12 and a core network device 14 are illustrated on the left side of FIG. 2 and a configuration of the terminal 11 is illustrated on the right side of FIG. 2.

As illustrated in FIG. 2, the terminal 11 is configured to include a plurality of receiver antennas 20 each for receiving signals from the base station 12, a plurality of receiving sections 21 each for demodulating a received signal, a plurality of transmitting sections 22 each for modulating send data that is to be transmitted to the base station 12, a plurality of transmitter antennas 23 each for transmitting thus modulated send data, and a control section 24 for carrying out control of the entire terminal 11. Note that though not illustrated, in general, various functions are incorporated in the terminal 11 in addition to a display section and an operation section each of which serves as an input/output interface for users.

Each receiving section 21 of the terminal 11 is configured to be capable of receiving two CCs in each of the bands FB1 and FB2. The receiving section 21 converts a received RF signal to a baseband signal and carries out predetermined signal processing for data demodulation. Thereby, the receiving section 21 obtains demodulated data of each of the two CCs and transmits the demodulated data to the control section 24. Note that in practice, the receiving section 21 may be configured so that two CCs in a band are respectively received by separate receiver devices or alternatively the receiving section 21 may be configured so that the two CCs in a band are received by one receiver device.

Similarly, each transmitting section 22 of the terminal 11 is configured to be capable of transmitting two CCs in each of the bands FB1 and FB2. The transmitting section 22 carries out predetermined signal processing for data modulation with respect to send data for each of the two CCs that has been received from the control section 24, and then converts, to an RF signal, a baseband signal having been subjected to the signal processing. Then, the transmitting section 22 transmits the RF signal. Note that in practice, the transmitting section 22 may be configured so that two CCs in a band are respectively transmitted by separate transmitter devices or alternatively the transmitting section 22 may be configured so that two CCs in a band are transmitted by one transmitter device.

The control section 24 of the terminal 11 carries out various kinds of control involved in communication with use of the terminal 11. Examples of such control are control on processing of received data and send data and control on a carrier frequency of each of the transmitting/receiving sections 21 and 22. Note that the control section 24 is explained in detail later.

Further, as illustrated in FIG. 2, the base station 12 is configured to include a plurality of receiver antennas 30 each for receiving signals from the terminal 11, a plurality of receiving sections 31 each for demodulating a received signal, a plurality of transmitting sections 32 each for modulating send data that is to be transmitted to the terminal 11, a plurality of transmitter antennas 33 each for transmitting thus modulated send data, and a control section 34 for carrying out control of the entire base station 12. Note that the plurality of receiving sections 31, the plurality of transmitting sections 32, and the control section 34 are configured in the same manner as the plurality of receiving sections 21, the plurality of transmitting sections 22, and the control section 24, respectively, and explanations of the plurality of receiving sections 31 and the plurality of transmitting sections 32 are omitted here. Note that the control section 34 is explained in detail later.

Further, as illustrated in FIG. 2, each base station 12 is connected to the core network device 14. The core network device 14 carries out overall control of positional control, call control, service control, etc. that are relevant to wireless communication between the base station 12 and the terminal 11. Further, the core network device 14 is connected to the external Internet.

Figure 3:
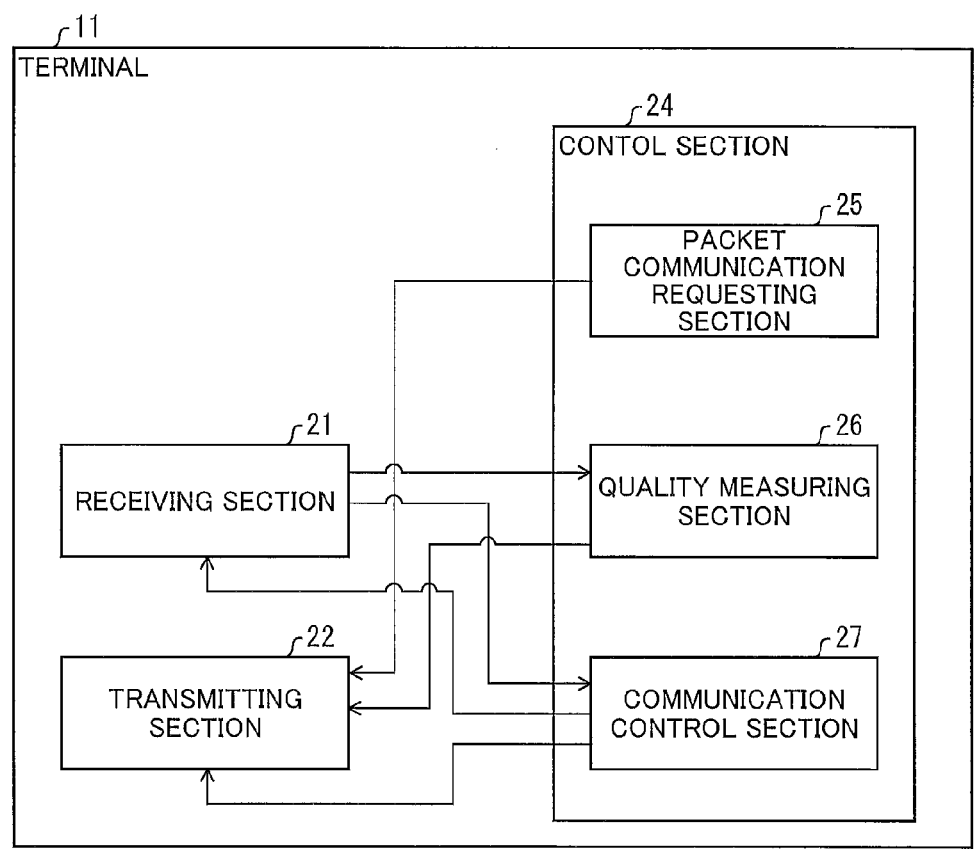
FIG. 3
Figure 4:
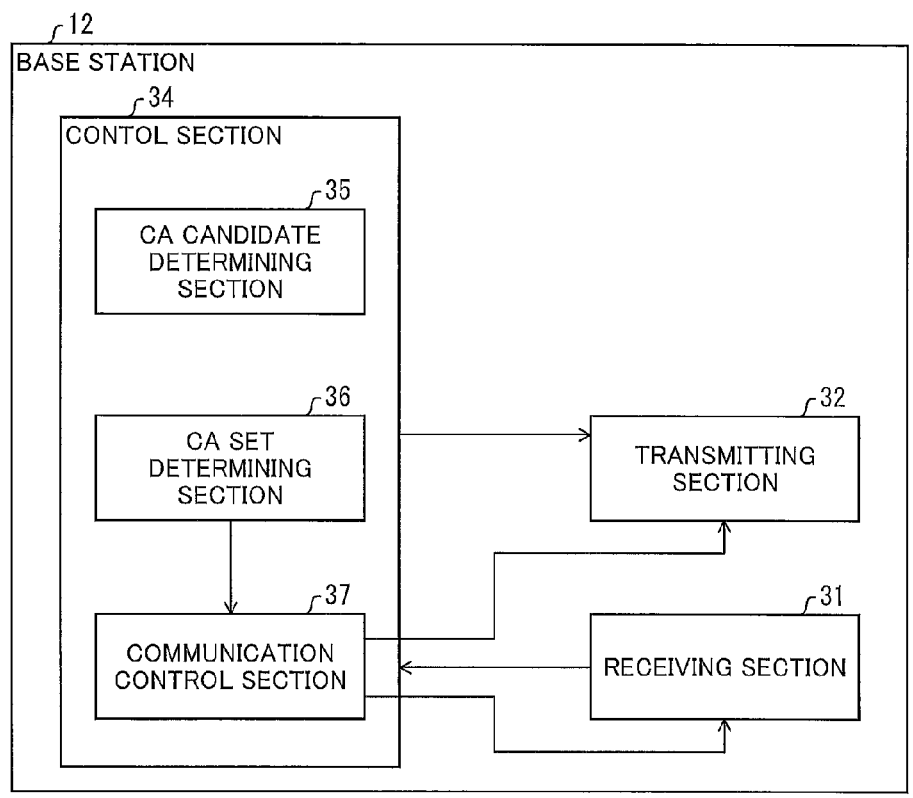
FIG. 4

Next, the following discusses details of the control section 24 of the terminal 11 and the control section 34 of the base station 12, with reference to FIGS. 3 and 4. FIG. 3 is a block diagram schematically illustrating a configuration of the terminal 11. As illustrated in FIG. 3, the control section 24 of the terminal 11 is configured to include a packet communication requesting section 25, a quality measuring section (quality measurement means) 26, and a communication control section (communication control means) 27.

The packet communication requesting section 25 makes a request for packet communication with the base station 12. More specifically, the packet communication requesting section 25 sends, to the base station 12 via the transmitting section 22, a request for packet connection, when a request for packet transmission (e.g., a request for uploading) or a request for packet reception (e.g., a request for downloading) is made by a user operation, etc. At this time, the packet communication requesting section 25 may include, in the request for packet connection, a purpose of packet connection such as uploading or downloading.

The quality measuring section 26 measures a communication quality of a DL-CC. More specifically, receiving a request for quality measurement from the base station 12 via the receiving section 21, the quality measuring section 26 measures a communication quality of each DL-CC contained in the request. In Embodiment 1, the quality measuring section 26 measures a communication quality of a DL-CC set that has been allocated by the base station 12. In a case where there is an onlyUL-CC, the quality measuring section 26 additionally measures a communication quality of a DL-CC corresponding to this onlyUL-CC. The quality measuring section 26 notifies thus measured quality level of each DL-CC to the base station 12 via the transmitting section 22.

Examples of such a communication quality of the DL-CC are a reception level and a transmission loss (path loss) that are relevant to a signal of the DL-CC. Further, the reception level includes a data reception level, a reference signal reception level, and the like. In addition, the terminal 11 (i) receives, from the base station 12 via the receiving section 21, transmission power information and (ii) measures a reception level of the signal of the DL-CC, so that the transmission loss can be obtained.

The communication control section 27 controls the receiving section 21 and the transmitting section 22. More specifically, the communication control section 27 receives, from the base station 12 via the receiving section 21, information on a DL-CC set (allocated DL-CCs) and an UL-CC set (allocated UL-CCs) each of which has been allocated to the terminal 11 by the base station 12. Then, the communication control section 27 controls the receiving section 21 so that the receiving section 21 receives data by use of the DL-CC set and also controls the transmitting section 22 so that the transmitting section 22 transmits data by use of the UL-CC set. Furthermore, the communication control section 27 receives, from the base station via the receiving section 21, information on communication control determined by the base station 12, and controls data reception by the receiving section 21 and data transmission by the transmitting section 22 in accordance with thus received information on communication control.

FIG. 4 is a block diagram schematically illustrating a configuration of the base station 12. As illustrated in FIG. 4, the control section 34 of the base station 12 is configured to include a CA candidate determining section 35, a CA set determining section (set allocation means) 36, and a communication control section (communication control determination means) 37.

The CA candidate determining section 35 determines CA candidates for carrying out CA connection in response to the request for packet connection, when the CA candidate determining section 35 receives the request for packet connection from the terminal 11 via the receiving section 31. The CA candidate determining section 35 makes a request for quality measurement of a plurality of DL-CCs included in the CA candidates that have been determined. This request is made with respect to the terminal 11 via the transmitting section 32.

The CA set determining section 36 determines a CA set for use in CA connection in accordance with a measurement result of the quality measurement of the DL-CC which quality measurement has been requested by the CA candidate determining section 35, when the CA set determining section 36 receives the measurement result from the terminal 11 via the receiving section 31. The CA set determining section 36 transmits information on thus determined CA set to the communication control section 37 and also to the terminal 11 via the transmitting section 32.

The communication control section 37 controls the receiving section 31 and the transmitting section 32 so that communication with the terminal 11 is carried out in accordance with the information on the CA set from the CA set determining section 36. Further, in Embodiment 1, the communication control section 37 determines communication control of the UL-CC set contained in the CA set in accordance with the quality level of the DL-CC which quality level has been measured by the terminal 11, when the communication control section 37 receives this quality level from the terminal 11 via the receiving section 31. The communication control section 37 transmits information on thus determined communication control to the terminal 11 via the transmitting section 32.

Examples of the communication control of the UL-CC encompass (i) transmission control for carrying out uplink transmission, (ii) transmission stop control for stopping the uplink transmission or shifting to an inactive state in which the UL-CC cannot be used, (iii) transmission restart control for restarting the uplink transmission or shifting back to an active state in which the UL-CC can be used, and (iv) handover control for shifting to uplink transmission directed to another base station.

Figure 5:
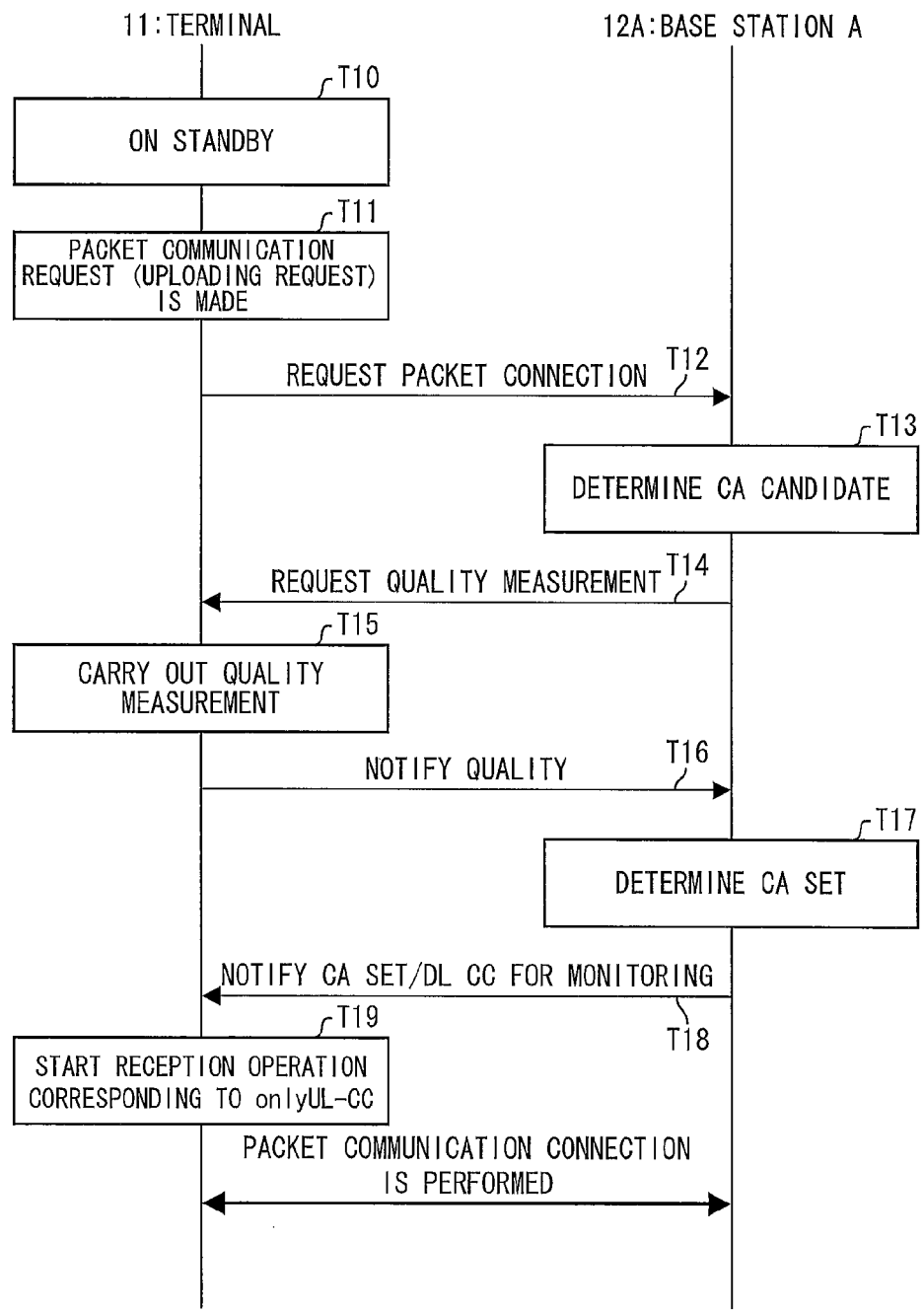
FIG. 5

The following discusses, with reference to FIGS. 5 through 18, how the terminal 11 and the base station 12 which are configured as described above operate. FIG. 5 is a sequence diagram showing an example of how the terminal 11 and the base station 12 operate in CA connection. The example of FIG. 5 shows a case where an onlyUL-CC is also specified at the CA connection. FIG. 5 will be explained with reference to FIGS. 1 and 2.

First, the terminal 11 is on standby (T10). For example, the terminal 11 is camping on a DL-CC 21 in the band FB2. Then, a packet transmission request including a request for uploading is made with respect to the terminal 11 by, for example, a user operation (T11).

In this case, the terminal 11 is connected to the base station 12A by use of a UL-CC 21 corresponding to the DL-CC 21 which the terminal 11 is currently camping on. Note that the terminal 11 is notified, by notification information in advance, of the UL-CC 21 corresponding to the DL-CC 21. Thereafter, the terminal 11 uses the UL-CC 21 to transmit, to the base station 12A, the packet connection request including the request for uploading (T12).

Meanwhile, the base station 12A determines CA candidates for carrying out the CA connection in accordance with the packet connection request (T13). According to the present example, the packet connection request includes the request for uploading (carrying out communication by use of UL-CCs which are larger in number than DL-CCs). Therefore, the base station 12A (i) determines to carry out the CA connection, (ii) determines candidates for CCs which can be used for CA, and (iii) uses the DL-CC 21 to transmit, to the terminal 11, a quality measurement request to measure qualities of thus determined CCs (T14). In case of uploading, for example, the base station 12A should select, as the CA candidates, CCs whose UL-CC communication traffic is low. Note that, in a case where the packet connection request is a request for voice telephone, low volume data communication, or the like, the base station 12A determines not to carry out the CA connection, and carries out communication by use of a CC to which the base station 12A is currently being connected.

The terminal 11 which has received the quality measurement request from the base station 12A carries out quality measurement of DL-CCs whose quality measurement has been requested (T15). Then, the terminal 11 uses the UL-CC 21 to notify the base station 12A of measured quality levels (T16). Meanwhile, the base station 12A determines a CC set (CA set) for use in communication in accordance with the notified measured quality levels of the respective DL-CCs (T17). A set of DL-CCs determined here is referred to as a DL-CC set, and a set of UL-CCs is referred to as a UL-CC set. Note that a process for determining the CA set is to be specifically described later.

In step T17, a larger number of UL-CCs are selected than DL-CCs, and an onlyUL-CC (UL-CC 11) is selected from among a UL-CC set. Next, the base station 12A uses the DL-CC 21 to notify the terminal 11 of the CA set (DL-CC set (DL-CC 21) and the UL-CC set (UL-CC 21 and UL-CC 11)) which have been determined in step T17 (T18). Note that according to the present example, the notification of only the DL-CC set and the UL-CC set is carried out in step T18. However, in a case where there exists, for example, a CC set necessary for other control, the base station 12A notifies the terminal 11 of such a CC set concurrently with the notification of the DL-CC set and the UL-CC set.

In a case where the onlyUL-CC is selected in step T17, the base station 12A includes a DL-CC (DL-CC 11) for ensuring a good quality (monitoring a quality) of the selected onlyUL-CC (UL-CC 11) in the notification in step T18, so as to specify such a DL-CC (DL-CC 11). Note that the base station 12A also notifies the terminal 11 of a parameter (e.g., a cell ID of a base station 12 transmitting a corresponding CC and a transmission level at the base station 12) which is necessary for the terminal 11 to receive the specified DL-CC for monitoring and then to secure a quality of the onlyUL-CC.

A method in which the base station 12 selects a DL-CC (DL-CC 11) for monitoring from among DL-CCs that are in one cell and one band is exemplified by the following three methods. Namely, a first method is a method in which the base station 12 selects a DL-CC which is associated with an onlyUL-CC in advance in the wireless communication system 10. The first method uses a linkage between a DL-CC and a UL-CC (Cell Specific Linkage), the linkage being notified by notification information.

A second method is a method in which the base station 12 selects a predetermined DL-CC for monitoring. For example, the second method is exemplified by a method in which the base station 12 selects, from among DL-CCs in one cell and one band, a DL-CC which is of a band that is the closest to a UL-CC band portion. Alternatively, the second method is exemplified by a method in which the base station 12 selects a DL-CC which all the base stations 12 can use. However, even when the base station 12 predetermines a DL-CC for monitoring, such a DL-CC may be used by another user for communication. A third method is a method in which the base station 12 selects, from among DL-CCs in one cell and one band as the onlyUL-CC, a DL-CC whose communication traffic is the highest.

The terminal 11 which has received the notification of the CA set starts monitoring the DL-CC (DL-CC 11) which has been specified for monitoring by the base station 12, because an onlyUL-CC is included in the CA set (T19). Note that the monitoring is to be specifically described later. Then, it is possible to carry out a packet communication connection by use of a specified CC. Note that, in a case where the packet communication connection is carried out by use of an onlyUL-CC, an initial transmission power value may be determined in accordance with a quality level of a DL-CC corresponding to the onlyUL-CC. However, it goes without saying that, in a case where the terminal 11 receives, from the base station 12, an instruction on an initial transmission power value at the packet communication connection, the terminal 11 carries out control in accordance with the instruction.

Data transmission is started after a packet connection is completed. The data transmission is carried out by use of the UL-CC 21 and the UL-CC 11 (onlyUL-CC). The DL-CC 21 is used to transmit, from the base station 12, a control signal such as ACK/NACK in response to transmitted data from the terminal 11. Meanwhile, in a case where the DL-CC 21 is used to receive data from the base station 12, not the onlyUL-CC but the UL-CC 21 is used to transmit, from the terminal 11, a control signal such as ACK/NACK in response to thus received data. As described earlier, the DL-CC 11 is a CC for monitoring a quality of an onlyUL-CC (described earlier) and is not included in a DL-CC set for communication. Accordingly, the DL-CC 11 is not used for communication of data, a control signal, and the like.

The above control makes it possible to carry out transmission control with respect to an onlyUL-CC with higher accuracy by activating a system for receiving a DL-CC corresponding to the onlyUL-CC, even when the onlyUL-CC is specified by the base station 12.

Figure 6:
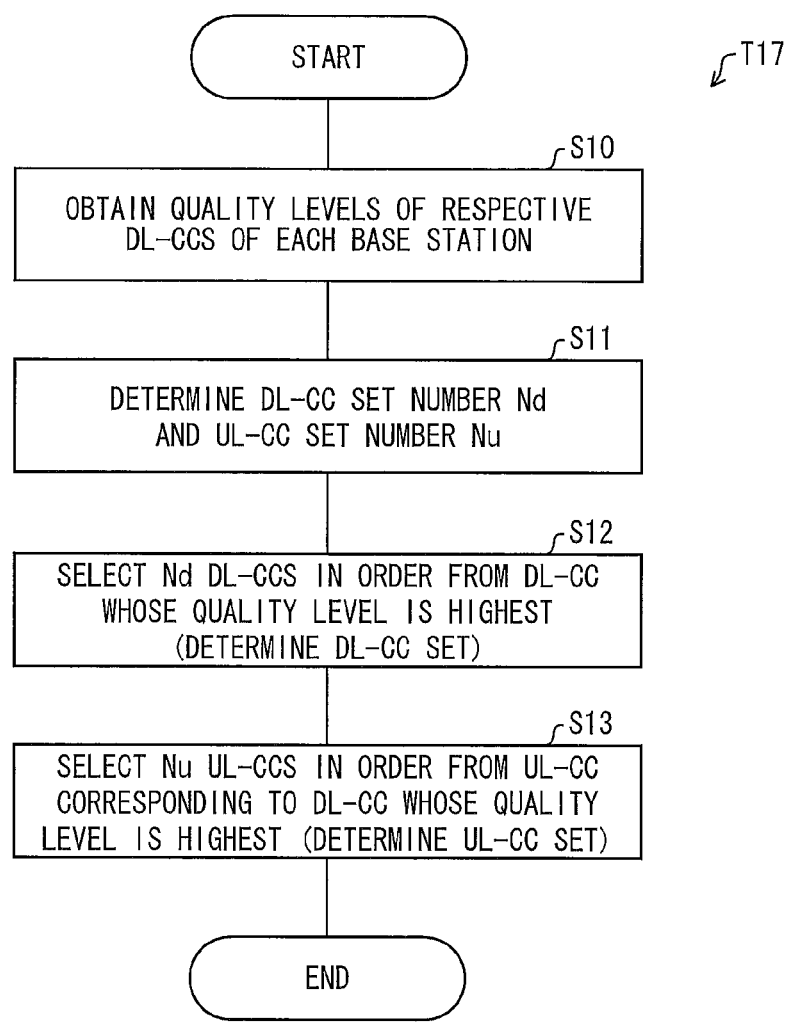
FIG. 6

Next, a process for determining a CA set is described below in detail, with reference to FIG. 6. FIG. 6 is a flowchart showing how the process (see FIG. 5) for determining a CA set (T17) is carried out.

First, the base station 12A obtains quality levels of respective DL-CCs of each base station 12, the quality levels having been notified from the terminal 11 (S10) (see FIG. 6). Next, the base station 12A determines a DL-CC set number Nd and a UL-CC set number Nu in accordance with a requested communication traffic, a communication traffic of a base station 12, and the like (S11). Subsequently, the base station 12A selects Nd DL-CCs in the order from a DL-CC whose quality level is the highest (S12). According to this, a DL-CC set is determined. Note that in step S12, in a case where a selected DL-CC has a poor quality level, the base station 12A may additionally carry out control for excluding such a selected DL-CC from the DL-CC set. In this case, the number of DL-CC sets becomes smaller than Nd.

Then, the base station 12A selects Nu UL-CCs in the order from a UL-CC corresponding to the DL-CC whose quality level is the highest (S13). According to this, a UL-CC set is determined. A CA set is thus determined. Note that in step S13, in a case where a selected DL-CC has a poor quality level, the base station 12A may additionally carry out control for excluding a UL-CC corresponding to the selected DL-CC from the UL-CC set as in the case of the DL-CC set. In this case, the number of UL-CC sets is smaller than Nu. In this case, if Nu>Nd, a larger number of UL-CCs are selected than DL-CCs. Therefore, an onlyUL-CC may be selected depending on a state of a quality level of a DL-CC and/or a communication traffic. FIGS. 5 and 6 show examples in each of which an onlyUL-CC is selected.

According to the flowchart of FIG. 6, in a case where the base station 12A selects UL-CCs in the order from a UL-CC corresponding to a DL-CC whose quality level is the highest, it is possible to select a UL-CC which is highly likely to have a favorable wireless propagation quality. Note that according to the examples described earlier, the base station 12A determines the number of DL-CC sets and the number of UL-CC sets first and then determines a CA set. Alternatively, depending on a quality level of a DL-CC, the base station 12A can additionally carry out control for redetermining a CA set after changing the number of DL-CC sets or UL-CC sets.

Figure 7:
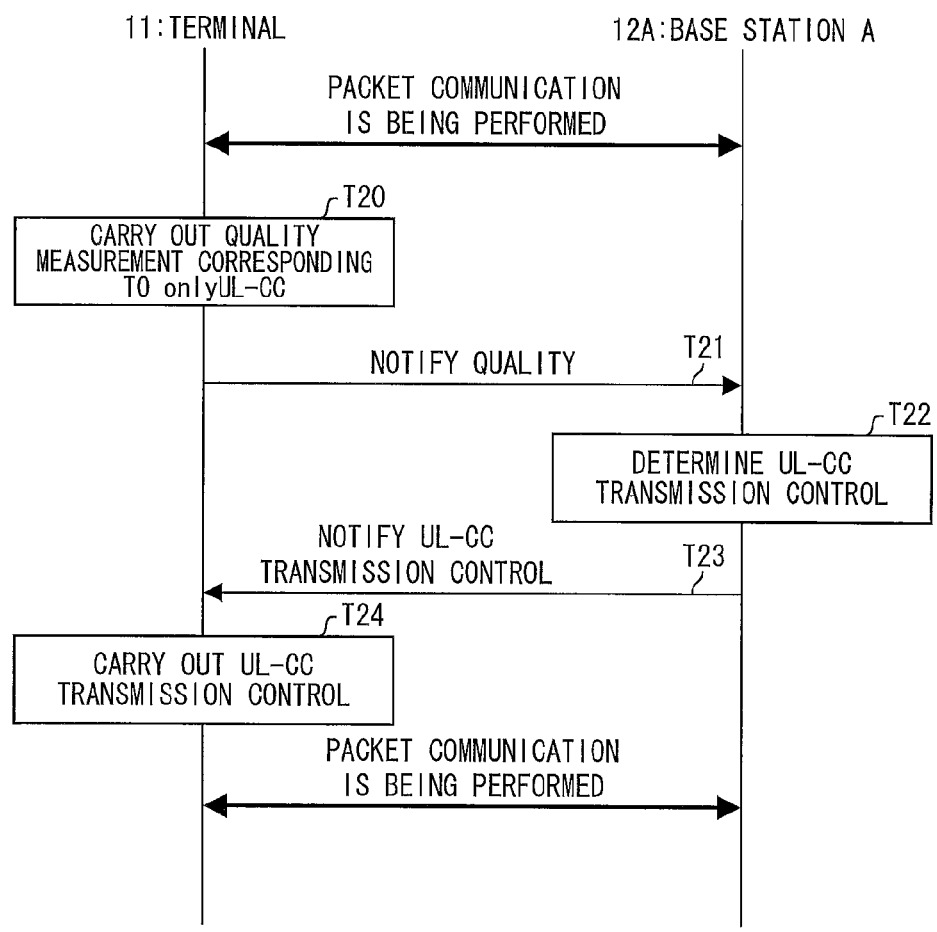
FIG. 7

Next, the following specifically describes how to monitor a DL-CC corresponding to an onlyUL-CC. FIG. 7 is a sequence diagram showing an example of how the terminal 11 and the base station 12 operate in onlyUL-CC transmission control. FIG. 7 shows an example of a case where a UL communication traffic is high. In this example, packet communication is being carried out in a state in which a UL-CC set including an onlyUL-CC is used (see FIG. 5).

Figure 8:
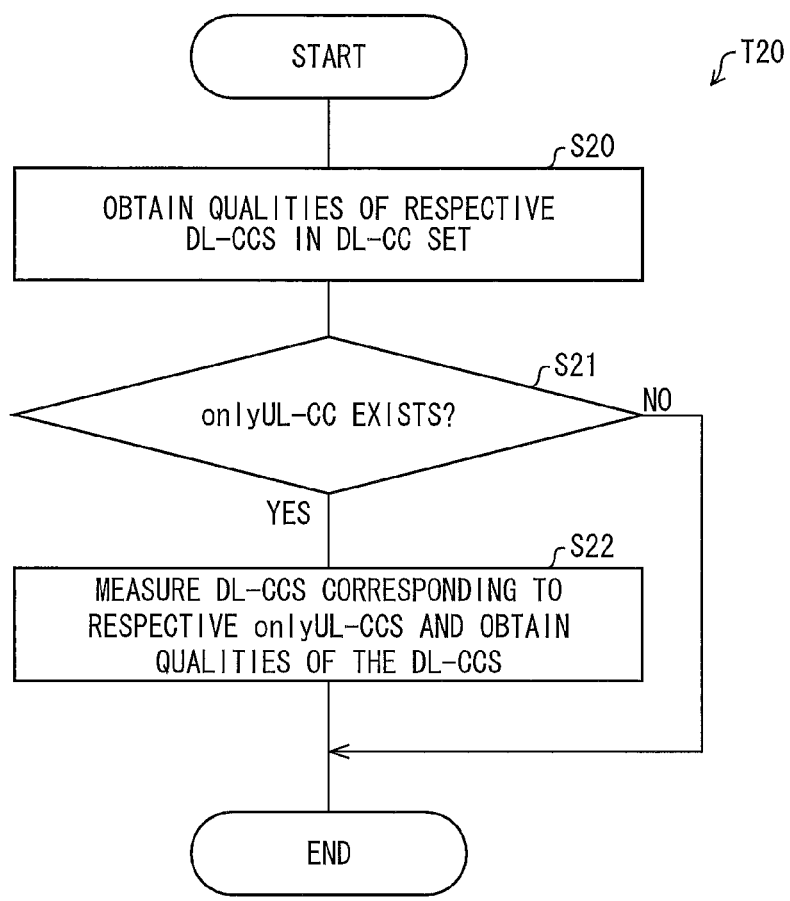
FIG. 8

First, the terminal 11 carries out quality measurement corresponding to an onlyUL-CC (T20) (see FIG. 7). FIG. 8 is a flowchart showing how a process for quality measurement corresponding to the onlyUL-CC is carried out.

First, the terminal 11 obtains qualities of respective DL-CCs in a DL-CC set which is currently under communication (S20) (see FIG. 8). Note that the qualities may be measured by a conventional method. Next, the terminal 11 determines whether or not there exists an onlyUL-CC (S21). In a case where the terminal 11 determines that there exists no onlyUL-CC, the process is ended. However, according to the present example, because the terminal 11 determines that there exists an onlyUL-CC, the terminal 11 obtains the qualities by measuring DL-CCs corresponding to respective onlyUL-CCs (S22). Thereafter, the process is ended.

Next, the terminal 11 uses the UL-CC 21 to notify the base station 12A of the obtained qualities of the respective DL-CCs (DL-CCs 21) in the DL-CC set and qualities of the respective DL-CCs (DL-CCs 11) corresponding to the respective onlyUL-CCs (UL-CCs 11) (T21) (see FIG. 7).

Subsequently, the base station 12A determines UL-CC transmission control in accordance with the notified qualities (T22). In this case, the base station 12A determines, for example, control of a transmission power, a transmission timing, and the like, and further control of whether or not to stop transmission, whether or not to shift a transmission CC to a non-active state, and the like. The base station 12A also determines transmission control (described earlier) with respect to an onlyUL-CC in accordance with a quality of a DL-CC (DL-CC 11) corresponding to the onlyUL-CC. Thereafter, the base station 12A uses the DL-CC 21 to notify the terminal 11 of the determined UL-CC transmission control (T23). The terminal 11 carries out the notified UL-CC transmission control (T24).

Note that the terminal 11 may carry out the quality measurement corresponding to an onlyUL-CC (described earlier) (T20 in FIG. 7, and FIG. 8) periodically or in accordance with an instruction from the base station 12A. In a case where the terminal 11 carries out the quality measurement corresponding to an onlyUL-CC in accordance with an instruction from the base station 12A, a sequence of making a quality measurement request from the base station 12A is added before step T20 in FIG. 7. In this case, the quality measurement request can include specification of a DL-CC which corresponds to an onlyUL-CC and which is to be measured. The quality measurement request can also include a parameter for allowing the terminal 11 to receive the DL-CC (described earlier). Note that FIGS. 5 and 6 illustrate control of all UL-CCs in a UL-CC set. Alternatively, such control may be replaced with control specialized in an onlyUL-CC.

Accordingly, transmission control is carried out in accordance with a quality level of a DL-CC which quality level corresponds to an onlyUL-CC and which quality level is closer to a wireless propagation quality of the onlyUL-CC. This allows onlyUL-CC transmission control with higher accuracy.

Figure 9:
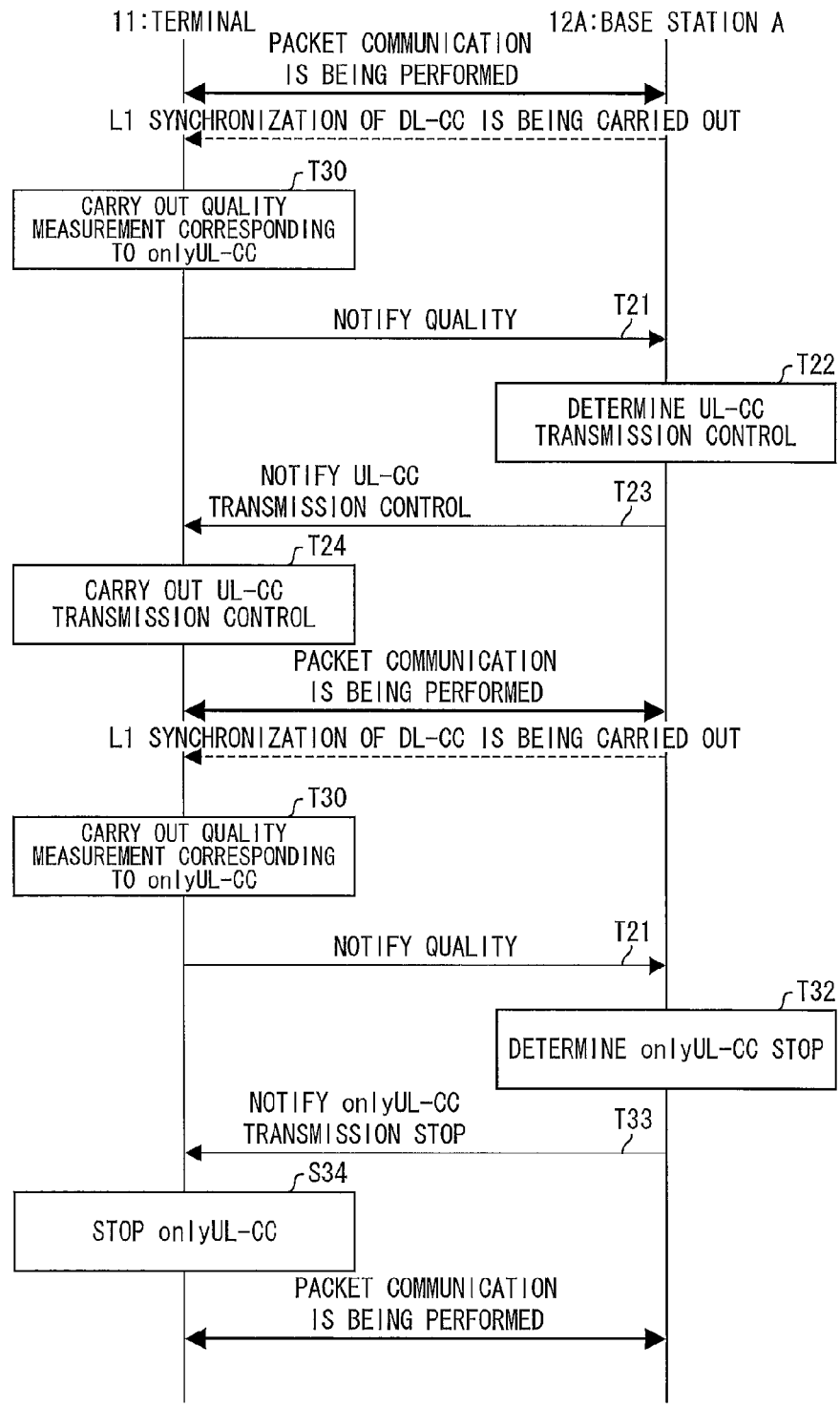
FIG. 9

FIG. 9 is a sequence diagram showing another example of how the terminal 11 and the base station 12 operate in onlyUL-CC transmission control. According to the example shown in FIG. 7, a quality of an onlyUL-CC is managed by monitoring, periodically or in accordance with an instruction from the base station 12, a DL-CC corresponding to the onlyUL-CC.

In contrast, according to the example shown in FIG. 9, a quality of an onlyUL-CC is managed by constantly carrying out synchronization of a DL-CC corresponding to the onlyUL-CC. For example, operation of maintaining synchronization (L1 synchronization) in a physical layer is constantly being carried out by demodulating a reference signal (known signal) in an entire or partial band of a DL-CC. In this case, when an onlyUL-CC is included in a UL-CC set when the terminal 11 is notified of the UL-CC set in step T18 shown in FIG. 5, or when the terminal 11 is notified, in another method, to use an onlyUL-CC, L1 synchronization of a DL-CC corresponding to the UL-CC set is started.

A reference signal is described here. For example, a wireless communication system complying with specifications for LTE uses OFDMA (Orthogonal Frequency Division Multiple Access) for downlink transmission. According to the OFDMA, a frequency and a time each are divided into a plurality of regions, and data are transmitted to a plurality of terminals 11 with the data provided in frequency-time regions obtained by the division. In this case, a known signal (pilot signal) is inserted into a given frequency-time region at a given cycle. This known signal is referred to as a reference signal.

The reference signal, which is used for channel (wireless propagation path) estimation, quality measurement, monitoring of a peripheral cell, and the like, can also be used for synchronization between the terminal 11 and the base station 12, since the reference signal is transmitted in a given cycle. Further, the reference signal has been subjected to modulation which depends on a cell. Accordingly, in a case where the terminal 11 demodulates, in a physical layer, a plurality of reference signals which have been transmitted in a band identical to that of an onlyUL-CC, the terminal 11 can specify a reference signal in a cell identical to that of an onlyUL-CC, and the synchronization in a physical layer can be realized by use of the specified reference signal.

The onlyUL-CC transmission control shown in FIG. 9 differs from the onlyUL-CC transmission control shown in FIG. 7 in process in which the terminal 11 carries out quality measurement corresponding to an onlyUL-CC. Further, the onlyUL-CC transmission control shown in FIG. 9 additionally includes operations of the terminal 11 and the base station 12 which operations are carried out in a case where the base station 12A determines onlyUL-CC transmission stop. The onlyUL-CC transmission control shown in FIG. 9 is similar to the onlyUL-CC transmission control shown in FIG. 7 in the other processes and operations. Note that processes and operations which are identical to those described earlier are given respective identical reference signs and descriptions thereof are omitted.

Figure 10:
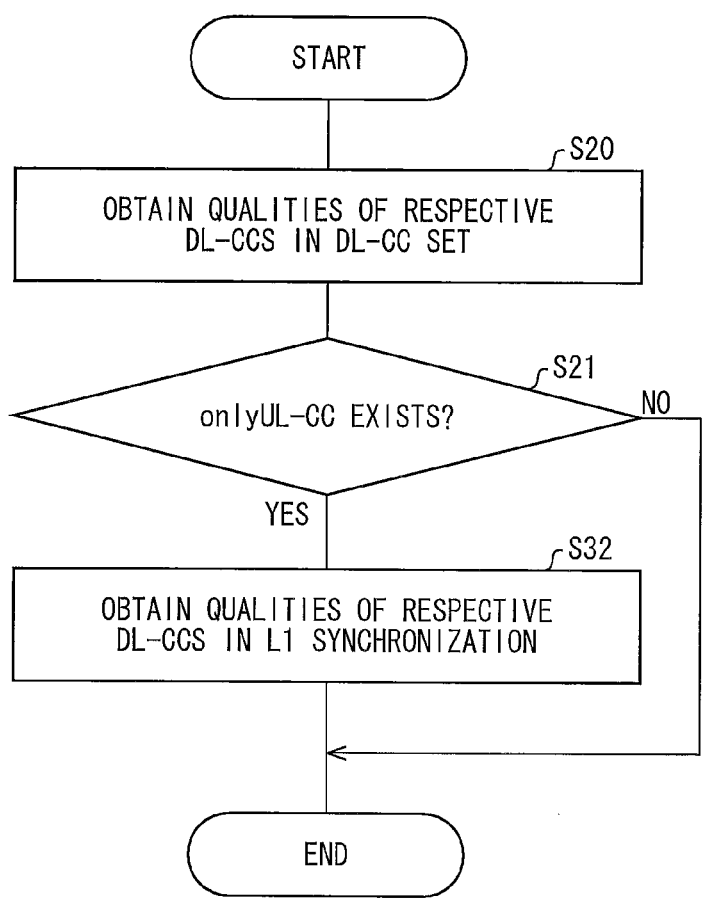
FIG. 10

FIG. 10 is a flowchart showing how a process for quality measurement corresponding to an onlyUL-CC (T30) (see FIG. 9) is carried out. The process shown in FIG. 10 differs from the process shown in FIG. 8 in that, in a case where there exists an onlyUL-CC (YES at S21), the terminal 11 obtains the qualities by measuring the respective DL-CCs in the L1 synchronization (S32). The process shown in FIG. 10 is similar to the process shown in FIG. 8 in the other processes.

In FIG. 9, in a case where the base station 12A determines onlyUL-CC (UL-CC 11) transmission stop control in accordance with the qualities notified in step T21 (T32), the base station 12A uses the DL-CC 21 to notify the terminal 11 of the determined onlyUL-CC stop control (T33). The terminal 11 which has been notified of the onlyUL-CC stop control stops transmitting an onlyUL-CC (T34). According to this, since it becomes unnecessary to monitor (synchronize) a DL-CC 11 corresponding to an onlyUL-CC, the terminal 11 also stops the monitoring (synchronization).

Note that the terminal 11 may also stop the monitoring (synchronization) not immediately but after continuing the monitoring (synchronization) for a given period. In this case, if a DL-CC 11 under the monitoring improves in quality within the given period, it is possible to transmit an onlyUL-CC again. Note that for an initial power value which is used to resume the transmission, it is possible (i) to use an electric power value used when the connection was stopped or (ii) to determine an initial electric value in accordance with a result of calculation of a wireless propagation path loss from a quality of the DL-CC 11. Note also that FIGS. 9 and 10 illustrate control of all UL-CCs in a UL-CC set. Alternatively, such control may be replaced with control specialized in an onlyUL-CC.

An onlyUL-CC is stopped not only when the onlyUL-CC deteriorates in quality but also when a main CC which is carrying out communication of various kinds of control such as transmission control is stopped or inactivated. Also in a case where no main CC exists, an onlyUL-CC is stopped when all the CCs are stopped or inactivated.

Accordingly, in a case where a DL-CC corresponding to an onlyUL-CC is constantly kept in synchronization, it is possible to carry out onlyUL-CC transmission control with higher accuracy and more dynamically. In a case where a reference signal is used for quality measurement of a DL-CC in a DL-CC set, a reference signal is similarly used also for quality measurement of a DL-CC corresponding to an onlyUL-CC. This makes it possible to carry out a process which is substantially equivalent to quality measurement of a DL-CC set.

Figure 11:
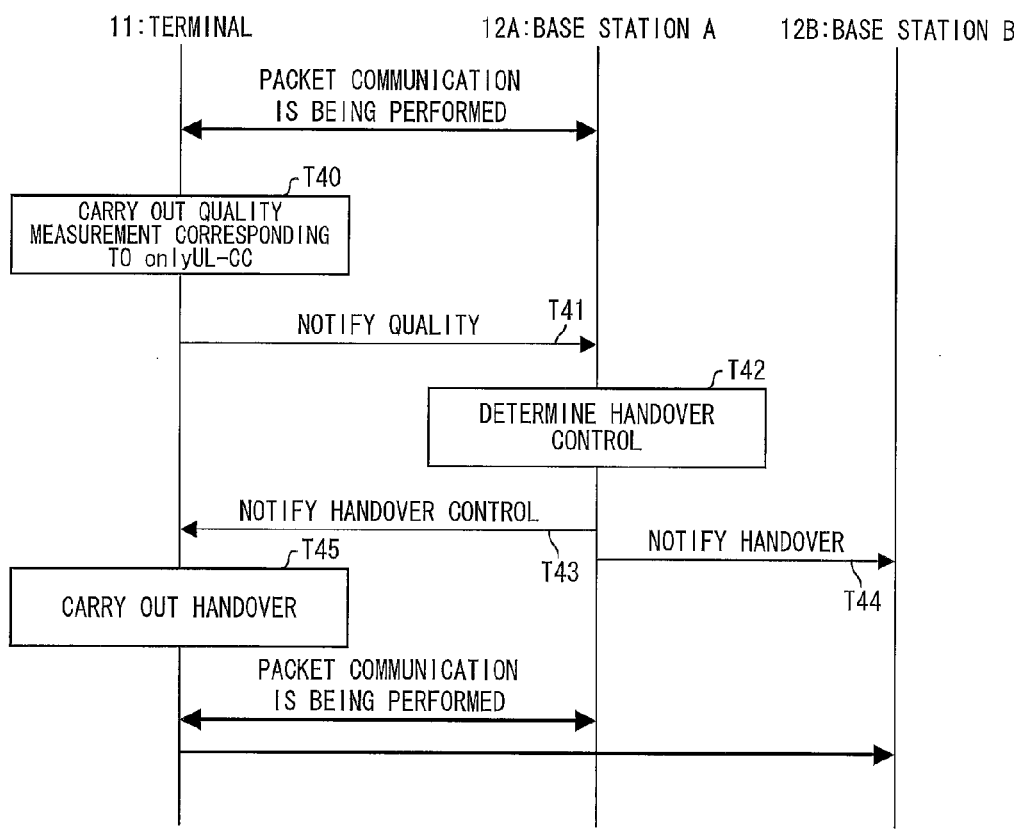
FIG. 11

FIG. 11 is a sequence diagram showing an example in accordance with Embodiment 1 of how the terminal 11 and the base stations A and B operate in onlyUL-CC handover control. The example of FIG. 11 shows a case where the terminal 11 moves from a point a to a point b and a UL communication traffic is high (see FIGS. 5 and 6). In this case, the terminal 11 is carrying out packet communication while using a UL-CC set including an onlyUL-CC.

Figure 12:
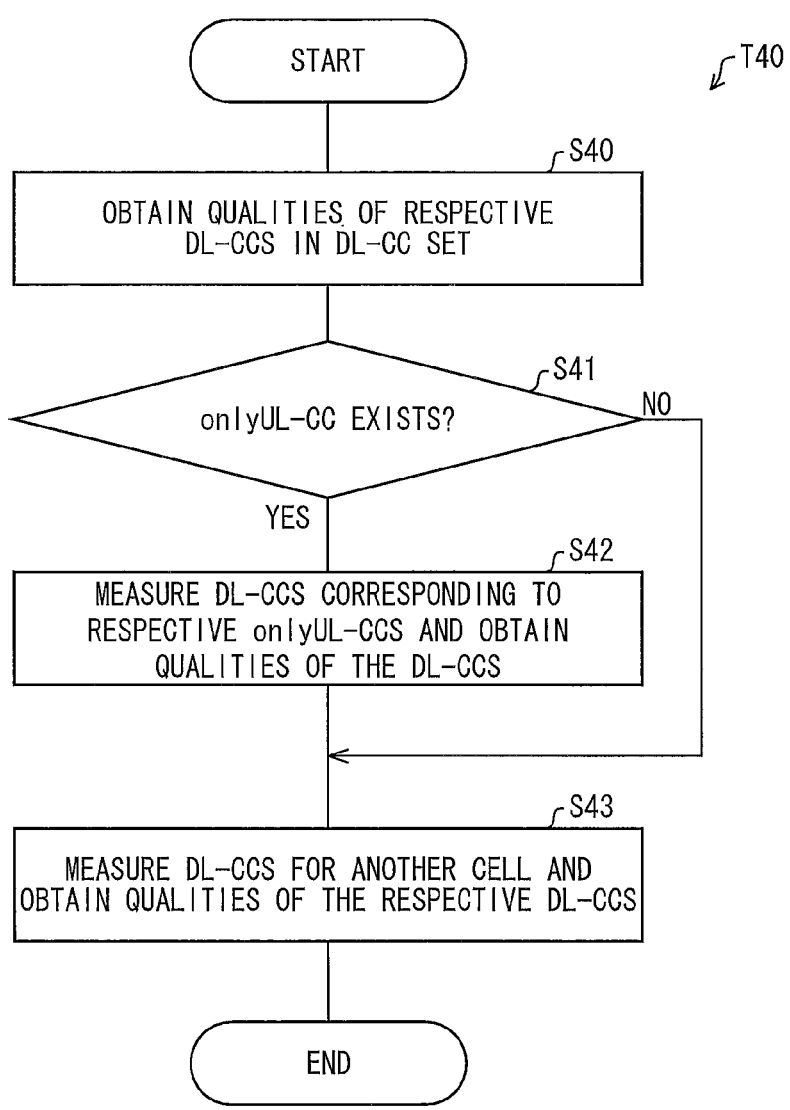
FIG. 12

First, the terminal 11 carries out quality measurement corresponding to an onlyUL-CC (T40) (see FIG. 11). FIG. 12 is a flowchart showing how a process for quality measurement corresponding to an onlyUL-CC is carried out.

First, the terminal 11 obtains qualities of respective DL-CCs in a DL-CC set which is currently under communication (S40) (see FIG. 12). Note that the qualities may be measured by a conventional method. Next, the terminal 11 determines whether or not there exists an onlyUL-CC (S41). In a case where the terminal 11 determines that there exists no onlyUL-CC, the process proceeds to step S43. However, according to the present example, there exists an onlyUL-CC. Therefore, the terminal 11 obtains the qualities by measuring DL-CCs corresponding to respective onlyUL-CCs (S42). Subsequently, the terminal 11 measures DL-CCs for another cell (the base station 12B), and obtains qualities of the respective DL-CCs (S43). Thereafter, the process is ended.

Next, the terminal 11 uses the UL-CC 21 to notify the base station 12A of the obtained qualities of the respective DL-CCs (DL-CCs 21) in the DL-CC set, qualities of the respective DL-CCs (DL-CCs 11) corresponding to the respective onlyUL-CCs, and the qualities of the respective DL-CCs of another cell (T41) (see FIG. 11). At this time, the terminal 11 also notifies the base station 12A of a quality of the UL-CC 11 by use of the UL-CC 21.

Subsequently, the base station 12A determines handover control in accordance with the notified qualities (T42). According to the present example, a DL-CC (DL-CC 11) corresponding to an onlyUL-CC (UL-CC 11) for the base station 12B is sufficiently higher in quality level than a DL-CC (DL-CC 11) corresponding to an onlyUL-CC (UL-CC 11) of the base station 12A. Having confirmed this fact, the base station 12A determines to carry out handover control from the base station 12A to the base station 12B with respect to an onlyUL-CC (UL-CC 11).

Thereafter, the base station 12A uses the DL-CC 21 to notify the terminal 11 of a handover parameter for handing over an onlyUL-CC from the base station 12A to the base station 12B (T43). Concurrently with this, the base station 12A uses the core network device 14 to notify the base station 12B that the onlyUL-CC (UL-CC 11) will be handed over from the base station 12A to the base station 12B (T44). Meanwhile, in accordance with the notified handover parameter, the terminal 11 carries out handover of only the onlyUL-CC (UL-CC 11) from the base station 12A to the base station 12B (T45).

Note that the terminal 11 may carry out the quality measurement corresponding to an onlyUL-CC (described earlier) (T40 in FIG. 11, and FIG. 12) periodically or in accordance with an instruction from the base station 12A. In a case where the terminal 11 carries out the quality measurement corresponding to an onlyUL-CC in accordance with an instruction from the base station 12A, a sequence for making a quality measurement request from the base station 12A is added before step T40 in FIG. 11. In this case, the quality measurement request can include specification of a DL-CC which corresponds to an onlyUL-CC and which is to be measured. The quality measurement request can also include a parameter that allows the terminal 11 to receive the DL-CC (described earlier).

Accordingly, handover control is carried out in accordance with a quality level of a DL-CC which quality level corresponds to an onlyUL-CC and which is closer to a wireless propagation quality of the onlyUL-CC. This allows onlyUL-CC handover control with higher accuracy. In particular, it becomes unnecessary to carry out special handover control with respect to an onlyUL-CC. Therefore, handover control can be carried out with higher accuracy by conventional control.

Figure 13:
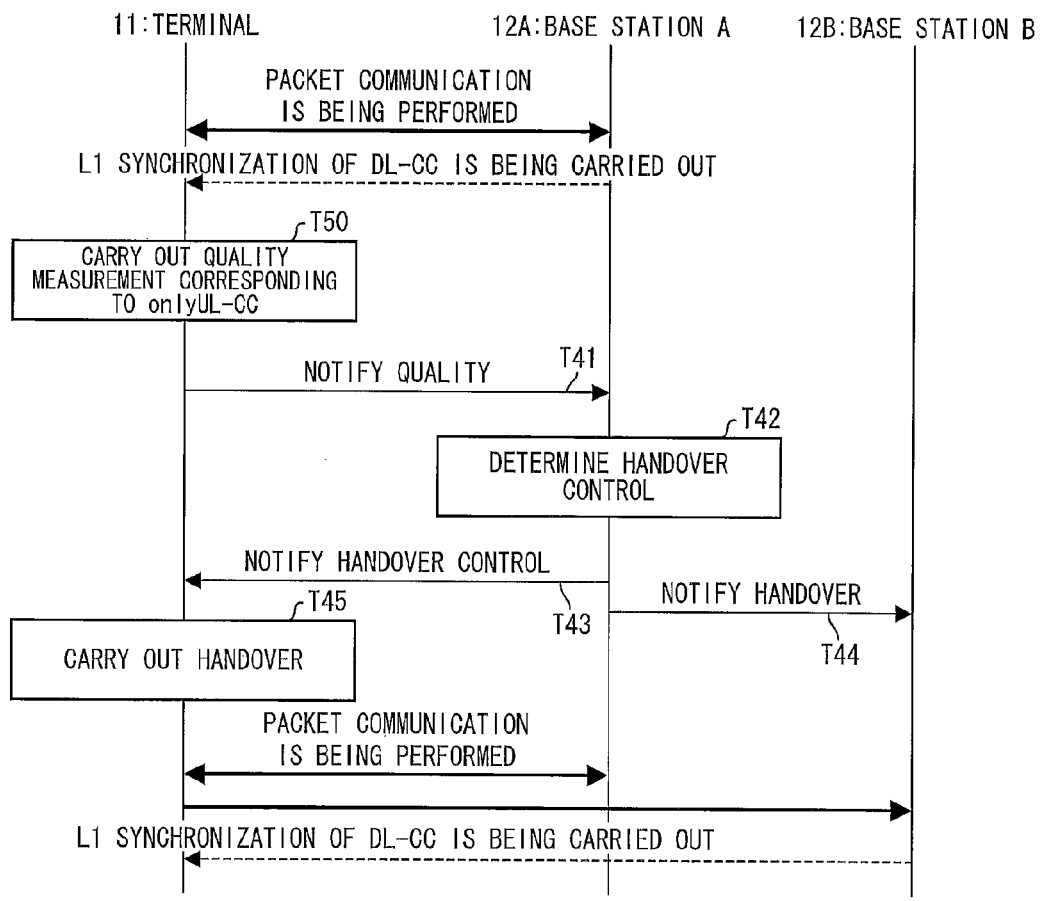
FIG. 13

FIG. 13 is a sequence diagram showing another example of how the terminal 11 and the base stations 12A and 12B operate in the onlyUL-CC handover control. According to the example shown in FIG. 11, a quality of an onlyUL-CC is managed by monitoring, periodically or in accordance with an instruction from the base station 12, a DL-CC corresponding to the onlyUL-CC. In contrast, according to the example shown in FIG. 13, as in the case of the examples shown in FIGS. 9 and 10, a quality of an onlyUL-CC is managed by constantly carrying out synchronization of a DL-CC corresponding to the onlyUL-CC.

The onlyUL-CC handover control shown in FIG. 13 differs from the onlyUL-CC handover control shown in FIG. 11 in process in which the terminal 11 carries out quality measurement corresponding to an onlyUL-CC. The onlyUL-CC handover control shown in FIG. 13 is similar to the onlyUL-CC handover control shown in FIG. 11 in the other processes and operations. Note that processes and operations which are identical to those described earlier are given respective identical reference signs and descriptions thereof are omitted.

Figure 14:
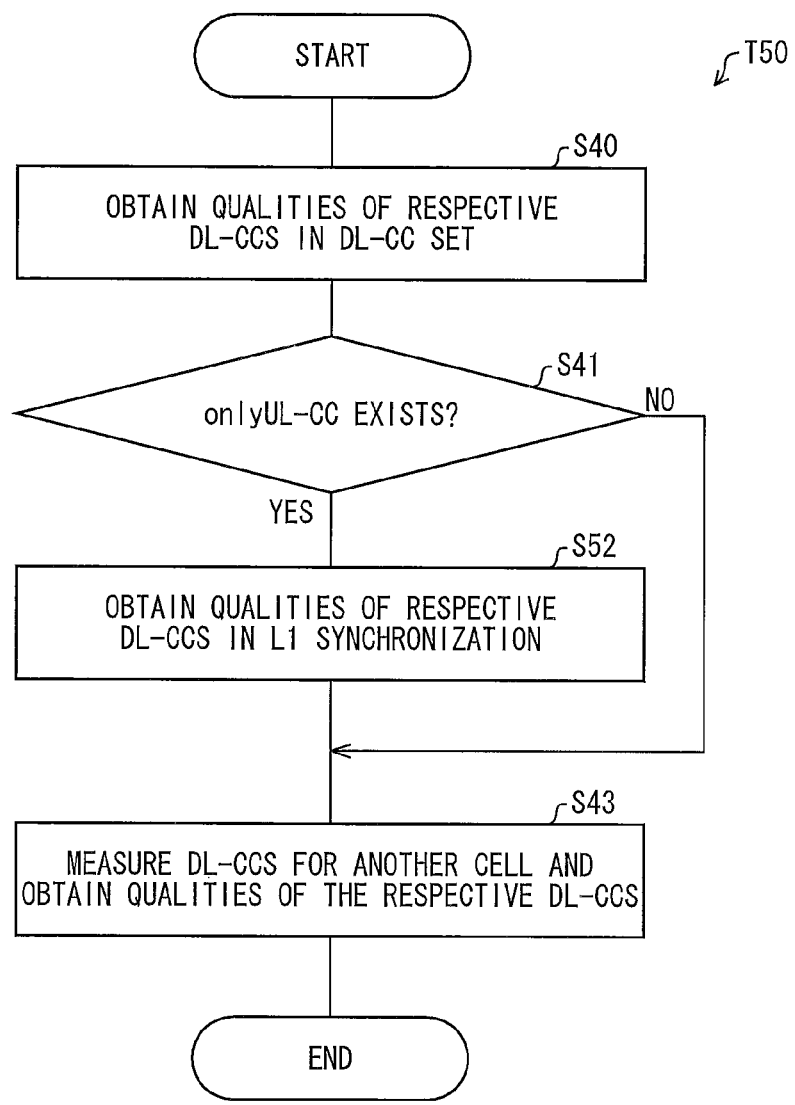
FIG. 14

FIG. 14 is a flowchart showing how a process for quality measurement corresponding to an onlyUL-CC (T50) (see FIG. 13) is carried out. The process shown in FIG. 14 (T50) differs from the process shown in FIG. 12 (T40) in that, in a case where there exists an onlyUL-CC (YES at S41), the terminal 11 obtains the qualities by measuring the respective DL-CCs in the L1 synchronization (S52). The process shown in FIG. 14 is similar to the process shown in FIG. 12 in the other processes.

Accordingly, in a case where a DL-CC corresponding to an onlyUL-CC is constantly kept in synchronization, it is possible to carry out handover control with higher accuracy. In a case where a reference signal is used for quality measurement of a DL-CC in a DL-CC set, a reference signal is similarly used also for quality measurement of a DL-CC corresponding to an onlyUL-CC. This makes it possible to carry out a process which is substantially equivalent to quality measurement of a DL-CC set.

Figure 15:
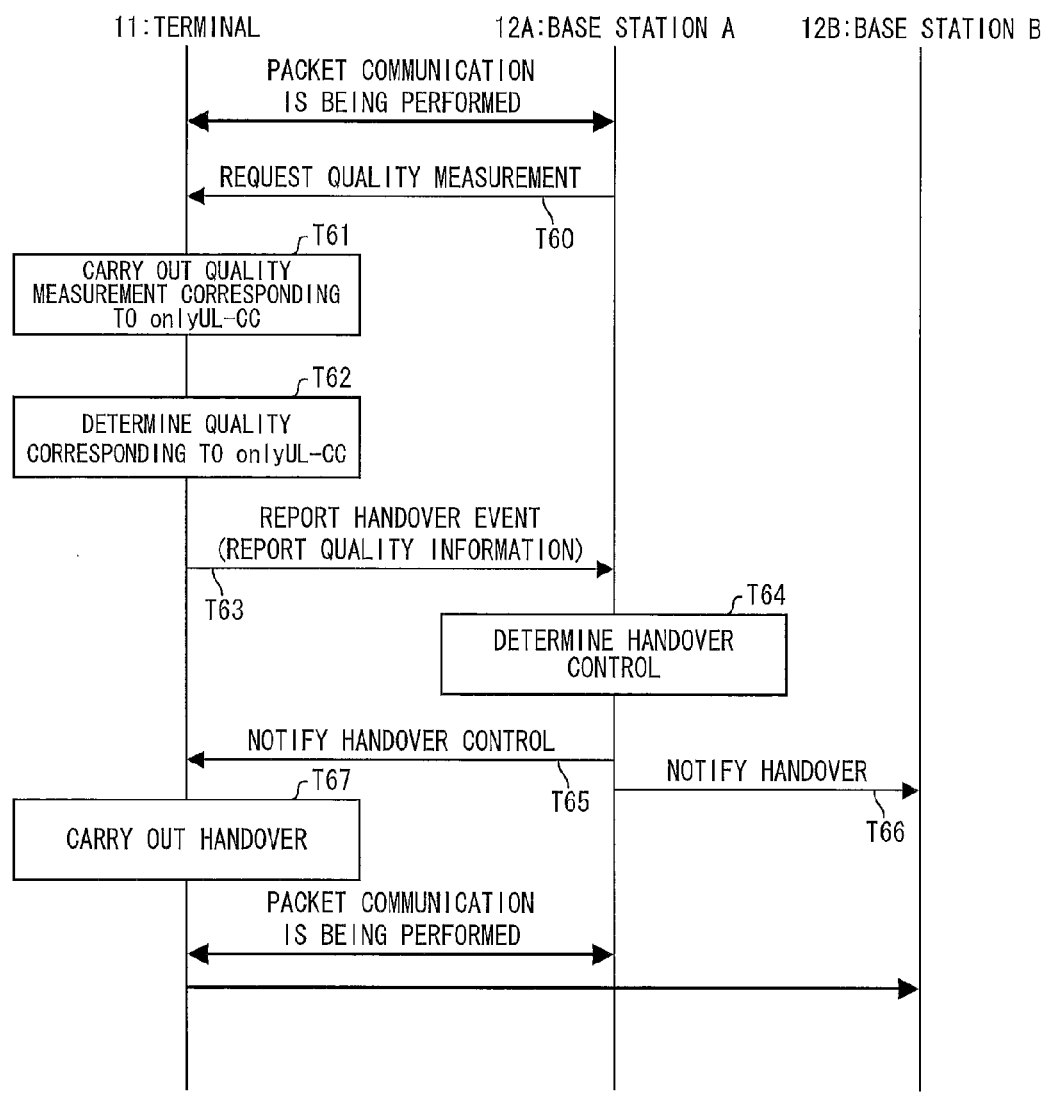
FIG. 15

FIG. 15 is a sequence diagram showing still another example of how the terminal 11 and the base stations 12A and 12B operate under the onlyUL-CC handover control. The handover control shown in each of FIGS. 11 through 14 is an example of a sequence in which the base station 12 determines a handover by obtaining quality levels of respective DL-CCs for peripheral cells from the terminal 11 and then comparing the quality levels. In contrast, FIG. 15 shows an example of a sequence in which the terminal 11 compares quality levels measured by the terminal 11 and reports a handover event (quality information) to a DL-CC which further deteriorates in quality level than that of another cell so that the base station 12 determines a handover.

The example of FIG. 15 shows a case where a UL communication traffic is high (see FIGS. 5 and 6). In this case, the terminal 11 is carrying out packet communication while using a UL-CC set including an onlyUL-CC.

The base station 12 uses the DL-CC 21 to transmit a quality measurement request to the terminal 11 (T60) (see FIG. 15). In response to the quality measurement request, the terminal 11 measures quality levels of a DL-CC (DL-CC 21) under communication, a DL-CC (DL-CC 11) corresponding to the onlyUL-CC (UL-CC 11), and each DL-CC of another cell (T61). Note that the measurement of the quality levels can be carried out as in the case of the process shown in FIG. 12.

Next, the terminal 11 compares the obtained quality levels between each of the DL-CCs (DL-CC 21 and DL-CC 11) of its own cell (the base station 12A) and the each DL-CC of the another cell (base station 12B) (T62). In this case, if the each of the DL-CCs of its own cell is inferior in quality level to the each DL-CC of the another cell, the terminal 11 uses the UL-CC 21 to report this as a handover event (quality information) to the base station 12 (T63). According to the example shown in FIG. 15, having determined that the DL-CC 11 which is being monitored further deteriorates in quality level than the each DL-CC of the another cell, the terminal 11 reports, to the base station 12, the handover event with respect to the DL-CC 11 (onlyUL-CC).

Note that it is desirable to determine deterioration in quality level by comparing the quality levels with a certain level of hysteresis. Note also that it is possible to consider, as different types, (i) the handover event indicating that the DL-CC (DL-CC 21) of its own cell under communication deteriorates to a level that is inferior to the DL-CC (DL-CC 21) of the another cell and (ii) the handover event indicating that the DL-CC (DL-CC 11) for monitoring the onlyUL-CC of its own cell deteriorates to a level that is inferior to the DL-CC (DL-CC 11) of the another cell.

Next, the base station 12 determines handover control in accordance with the contents of the handover event received from the terminal 11 and communication traffic on the cell (T64). According to the present example, the base station 12A which has determined onlyUL-CC handover control uses the DL-CC 21 to notify the terminal 11 of a handover parameter for handing over an onlyUL-CC from the base station 12A to the base station 12B (T65). Concurrently with this, the base station 12A uses the core network device 14 to notify the base station 12B that the onlyUL-CC (UL-CC 11) will be handed over from the base station 12A to the base station 12B (T66).

Meanwhile, in accordance with the notified handover parameter, the terminal 11 hands over only the onlyUL-CC (UL-CC 11) from the base station 12A to the base station 12B (T67). Note that the terminal 11 may also periodically carry out the quality measurement corresponding to an onlyUL-CC (described earlier) (T61 in FIG. 15), though the quality measurement is carried out in response to reception of the quality measurement request from the base station 12.

Accordingly, in case of carrying out a handover, handover control can be carried out with high accuracy by using quality levels of respective DL-CCs in a DL-CC set of a desired one of the base stations 12 and a quality level of a DL-CC corresponding to an onlyUL-CC.

Figure 16:
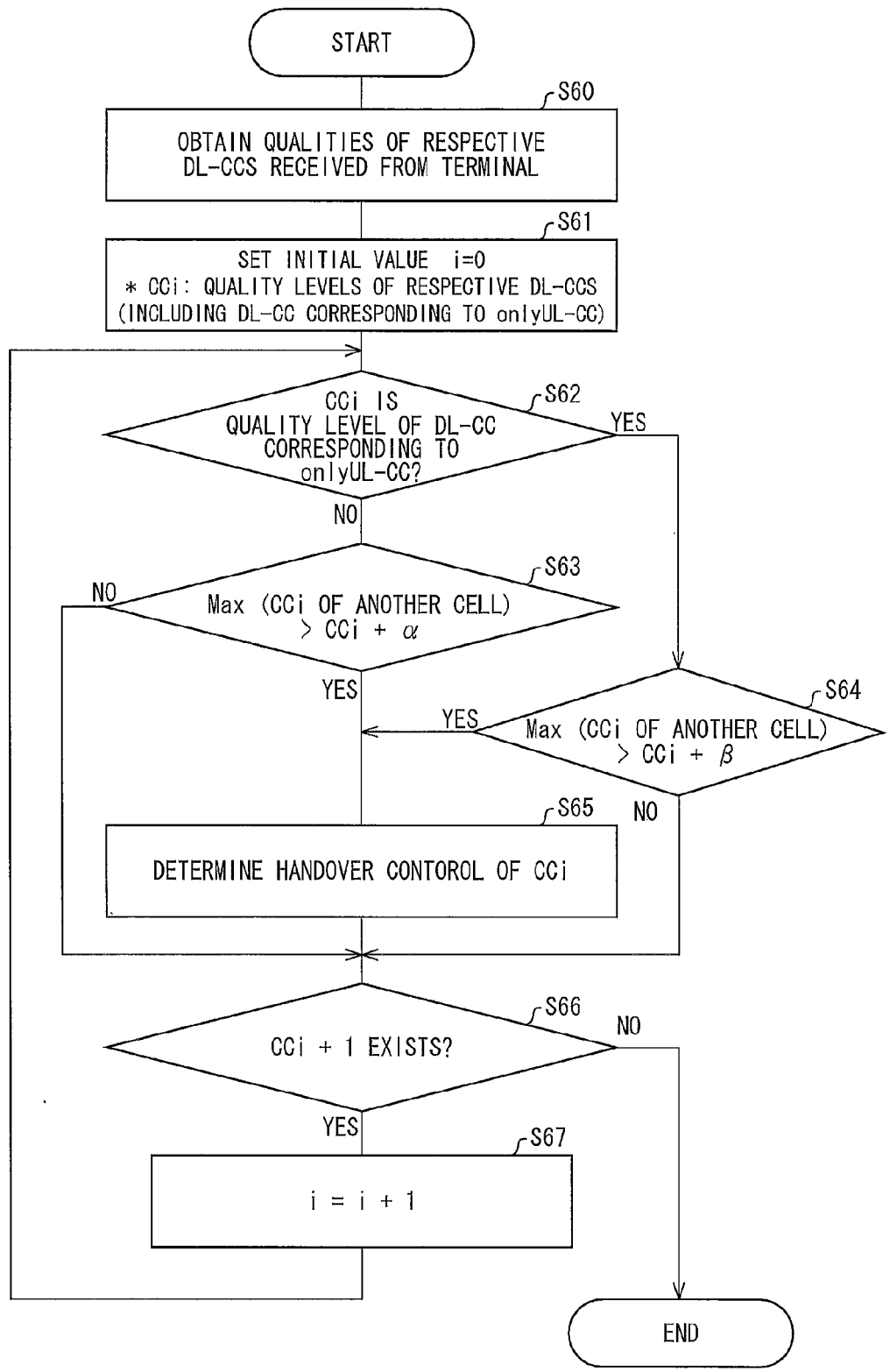
FIG. 16

FIG. 16 is a flowchart showing an example of a process in which a threshold for determining whether or not to carry out a handover is changed by use of quality levels of respective DL-CCs in a DL-CC set and a quality level of a DL-CC corresponding to an onlyUL-CC. FIG. 16 shows an example of the process in which the base station 12 determines a quality level (T42 in each of FIGS. 11 and 13).

First, the base station 12A obtains qualities of respective DL-CCs received from the terminal 11 (S60), and sets an initial value (S61) (see FIG. 16). The DL-CCs thus obtained include a DL-CC corresponding to an onlyUL-CC.

Next, in a case where a quality level of any one of obtained DL-CCs is not a quality level of a DL-CC corresponding to an onlyUL-CC and a maximum quality level of a DL-CC of another cell is higher than a sum of the quality level of the one of the DL-CCs and a threshold $\alpha$, the base station 12A determines handover control of the one of the DL-CCs (S62, S63, S65).

Meanwhile, in a case where a quality level of any one of obtained DL-CCs is a quality level of a DL-CC corresponding to an onlyUL-CC and a maximum quality level of a DL-CC of another cell is higher than a sum of the quality level of the one of the DL-CCs and a threshold $\beta$, the base station 12A determines handover control of the one of the DL-CCs (S62, S64, S65). Note that according to the present example, the threshold $\beta$ is larger in value than the threshold $\alpha$. The above process is carried out with respect to all the obtained DL-CCs, and then the process is ended.

According to this, for example, a DL-CC which has been determined to be subjected to handover control and a UL-CC corresponding to the DL-CC are handed over. Note that, in a case where handover control of a DL-CC corresponding to an onlyUL-CC is determined, only the onlyUL-CC is handed over. Note also that handover control of a plurality of DL-CCs may be determined and a plurality of handovers are carried out in this case.

Accordingly, since a handover of an onlyUL-CC uses the threshold $\beta$ which is larger than the threshold a of a typical handover, incorrect handover control is prevented from being carried out in a case where quality measurement of a DL-CC corresponding to an onlyUL-CC is carried out with low accuracy, i.e., varies widely.

Note that according to the examples described earlier, the threshold is changed in accordance with whether or not a quality level of a DL-CC is a quality level of a DL-CC corresponding to an onlyUL-CC. The threshold may alternatively be changed in accordance with an accuracy of an expected quality level of a DL-CC. For example, even a DL-CC in a DL-CC set may not be in communication in a case where the DL-CC is not activated. In such a case, a threshold of a quality level of such a DL-CC can be increased as compared to that of an activated DL-CC.

Note here that the DL-CC which is not activated means a DL-CC which is in a DL-CC set but which cannot be allocated for received data of the terminal 11. Such a DL-CC is normally saving power. In contrast, the activated DL-CC means a DL-CC which can be allocated for received data of the terminal 11 and is constantly being received.

According to the examples described earlier, the base station 12 determines a quality level. Similarly, also in the case where the terminal 11 determines a quality level (FIG. 15), a DL-CC corresponding to an onlyUL-CC and a DL-CC which is being used for communication can differ in threshold for determining a quality level.

Figure 17:
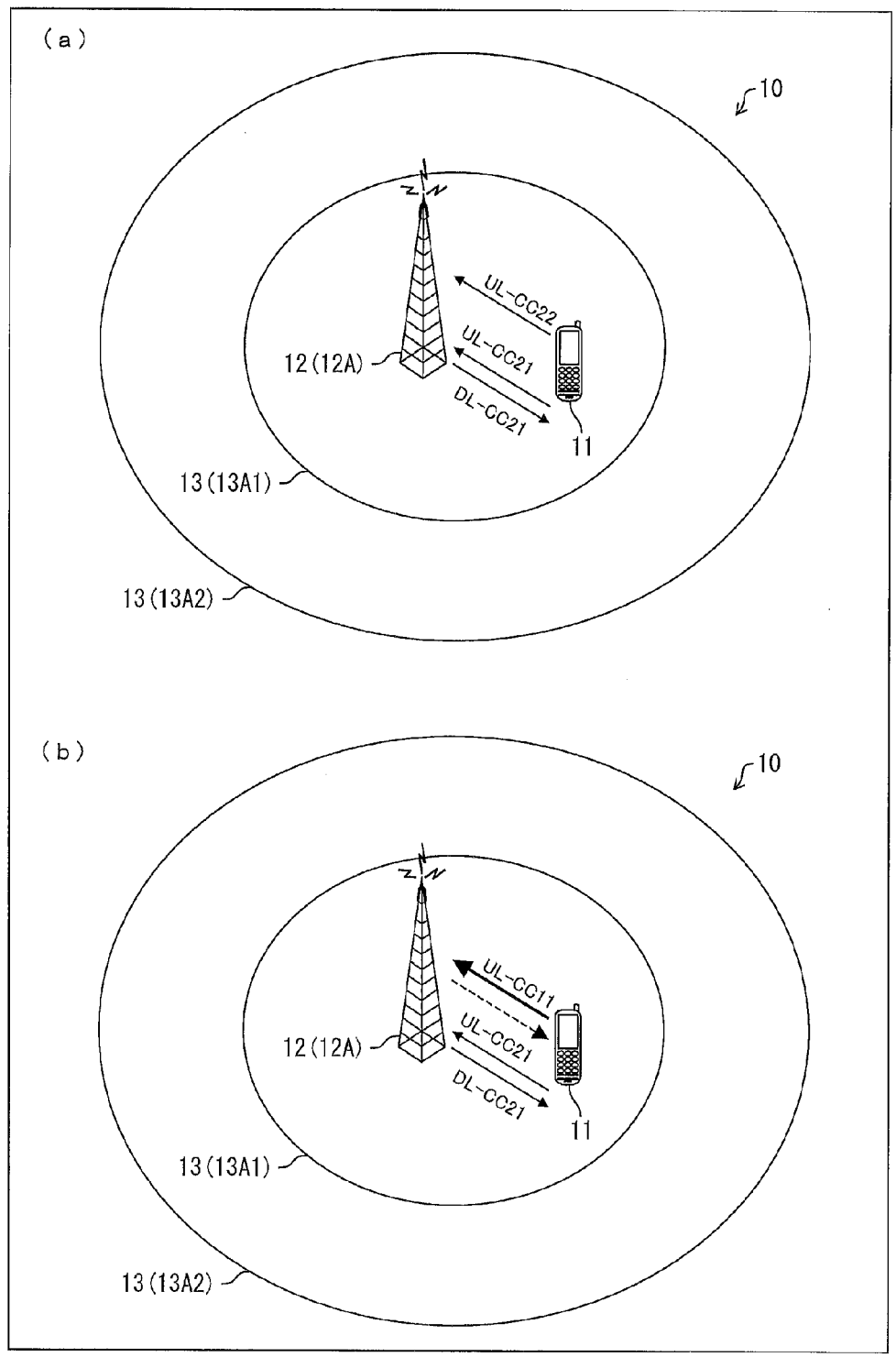
FIG. 17

FIG. 17 is a schematic diagram showing a case where a UL-CC becomes an onlyUL-CC during communication in the wireless communication system 10 of Embodiment 1. According to (a) of FIG. 17, as in the case of FIG. 1, two UL-CCs (the UL-CC 21 and the UL-CC22) and one DL-CC (the DL-CC 21) are used to carry out communication. Note that according to (a) of FIG. 17, no onlyUL-CC exists since only a CC in the band FB2 is used to carry out communication.

Assume here that a UL communication traffic is high in the band FB2 and a UL communication traffic is low in the band FB1. In this case, the base station 12A controls the terminal 11 in regard to scheduling so that the terminal 11 uses a UL-CC (UL-CC 11) in the band FB1 in place of one of two UL-CCs which are under communication in the band FB2.

The terminal 11 thus controlled hands over (changes) one (UL-CC22) of the UL-CCs which are in communication with the base station 12A to the UL-CC (UL-CC 11) in the band FB1 (see (b) of FIG. 17). In this case, since the UL-CC in the band FB1 becomes an onlyUL-CC, a quality is secured by monitoring or constant synchronization of a DL-CC corresponding to the onlyUL-CC (described earlier).

Figure 18:
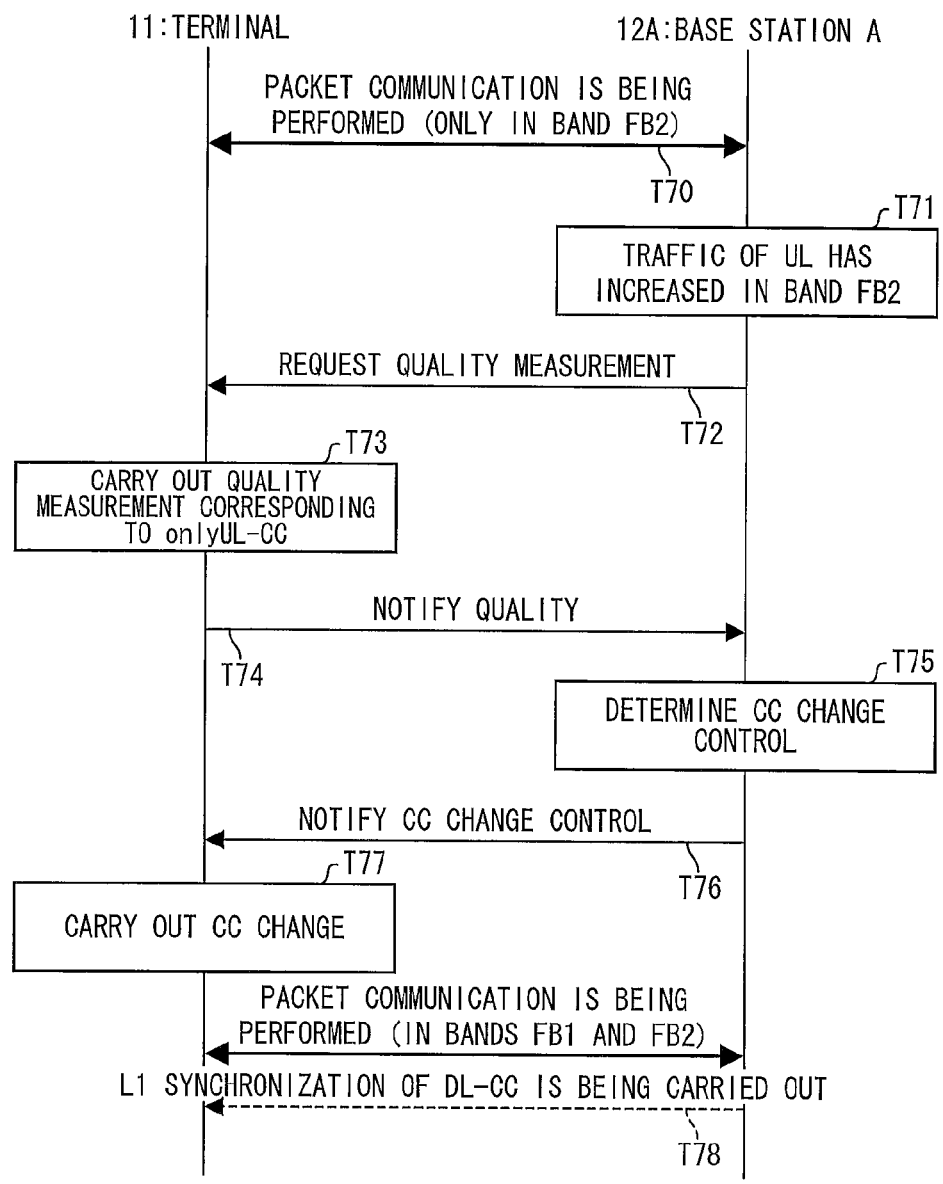
FIG. 18

FIG. 18 is a sequence diagram showing an example, shown in FIG. 17, of how the terminal 11 and the base station 12A operate in the case where a UL-CC is changed to an onlyUL-CC during communication. First, communication is carried out only in the band FB2 (T70, (a) of FIG. 17). Thereafter, the base station 12A detects that a UL communication traffic has increased in the band FB2 (T71), and then transmits, to the terminal 11, a quality measurement request including a quality measurement request of a CC in the band FB1.

In response to the received quality measurement request, the terminal 11 carries out quality measurement corresponding to an onlyUL-CC (T73). The process of this quality measurement is similar to that of the quality measurement shown in FIG. 12. However, according to the present example, not each DL-CC of another cell but a DL-CC (e.g., DL-CC in the band FB1) indicated by the base station 12 is measured.

Then, the terminal 11 notifies the base station 12A of a measured quality level of a DL-CC (T74). In accordance with the quality level notified from the terminal 11, the base station 12A determines whether or not to carry out CC change control (handover control) (T75). Note here that, in a case where the band FB1 between the base station 12A and the terminal 11 has a favorable quality level, the base station 12A determines to carry out change control (handover control) of one of the UL-CCs in the band FB2 to a UL-CC (onlyUL-CC) in the band FB1 (T75).

Next, the base station 12A notifies the terminal 11 of a parameter for carrying out the CC change control (handover control) (T76). In this case, a UL-CC is changed to an onlyUL-CC. Therefore, according to need, the base station 12A also gives the terminal 11 a start instruction to activate a DL-CC corresponding to the onlyUL-CC. The start instruction includes a monitoring instruction, a constant synchronization instruction, a quality measurement instruction, and the like.

Subsequently, in accordance with the notified parameter, the terminal 11 changes CCs, i.e., changes a UL-CC in the band FB2 of the base station 12A to a UL-CC in the band FB1 of this base station 12A (T77). In this case, a system for receiving a DL-CC corresponding to the UL-CC is activated according to need. This realizes communication as shown in (b) of FIG. 17. Thereafter, L1 synchronization is carried out with a DL-CC corresponding to an onlyUL-CC (T78).

Accordingly, even if a UL communication traffic increases, it is possible to flexibly change a UL-CC to an onlyUL-CC and to carry out subsequent transmission control with high accuracy. Note that according to the examples described earlier, a UL-CC is changed to an onlyUL-CC in a case where the base station 12 is identical and only the band is changed. The same applies to a case where the band is identical and only the base station 12 is changed.

[Embodiment 2]

Figure 19:
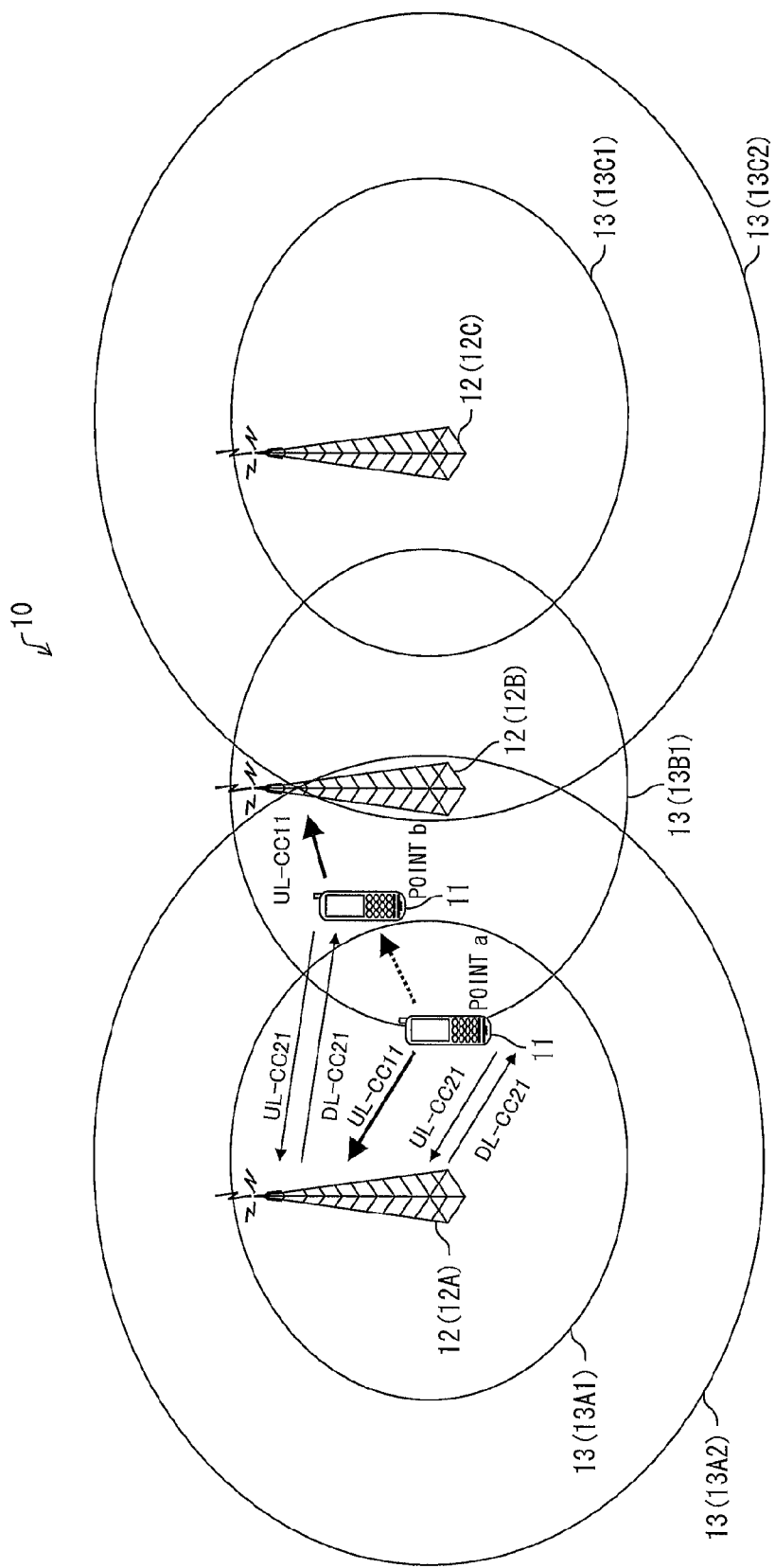
FIG. 19

Next, another embodiment of the present invention is described below with reference to FIGS. 19 through 26. FIG. 19 is a view schematically illustrating a wireless communication system of the present embodiment.

According to a wireless communication system 10 shown in FIG. 1, a quality of an onlyUL-CC is managed in such a manner that the terminal 11 (i) monitors a quality of a DL-CC (DL-CC 11) (a broken line arrow in FIG. 1) corresponding to the onlyUL-CC (UL-CC 11) and (ii) notifies the base station 12 of the quality. Meanwhile, according to a wireless communication system 10 shown in FIG. 19, a base station 12 measures and manages a quality of an onlyUL-CC (UL-CC 11). Accordingly, it is unnecessary for a terminal 11 to monitor a quality of a DL-CC (DL-CC 11) corresponding to an onlyUL-CC. Note that members and processes that are similar to those described in Embodiment 1 are given identical reference numerals, and are not explained repeatedly.

Figure 20:
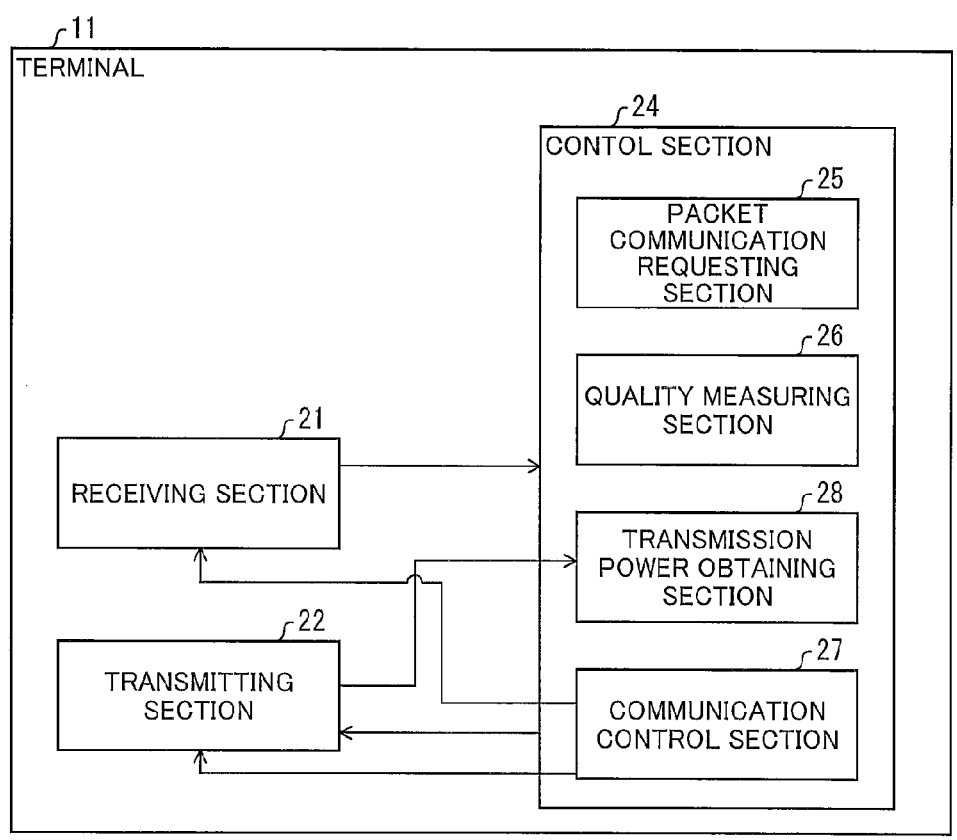
FIG. 20
Figure 21:
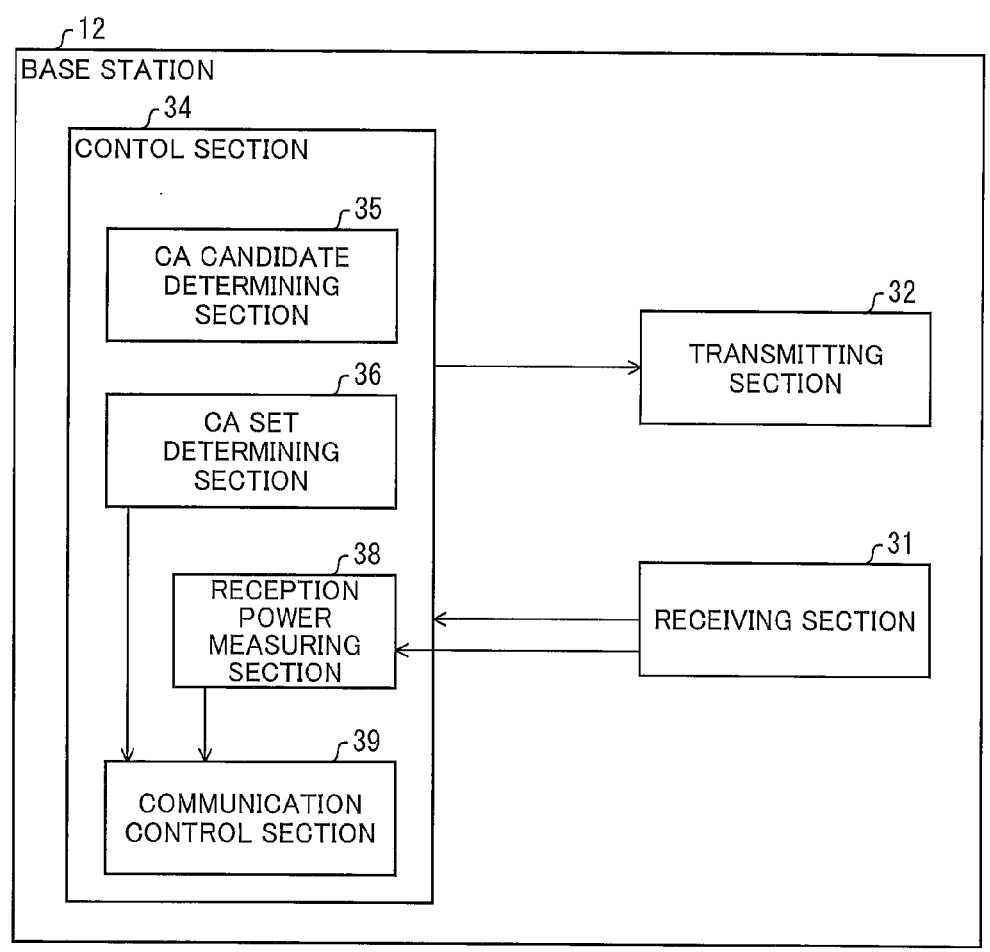
FIG. 21

The wireless communication system 10 of Embodiment 2 has a similar configuration to the wireless communication system 10 shown in FIG. 1. FIG. 20 is a block diagram schematically illustrating a configuration of the terminal 11 of Embodiment 2. FIG. 21 is a block diagram schematically illustrating a configuration of the base station 12 of Embodiment 2.

As shown in FIG. 20, the terminal 11 of Embodiment 2 has a similar configuration to the terminal 11 illustrated in FIG. 3 except that a control section 24 additionally includes a transmission power obtaining section (transmission power obtaining means) 28. As shown in FIG. 21, the base station 12 of Embodiment 2 has a similar configuration to the base station 12 illustrated in FIG. 4 except that a control section 34 (i) additionally includes a reception power measuring section (quality measurement means) 38 and (ii) includes a communication control section (communication control determination means, quality measurement means) 39 in place of the communication control section 37.

The transmission power obtaining section 28 obtains information on transmission power of a time at which a transmitting section 22 transmits data with use of an onlyUL-CC. The transmission power obtaining section 28 transmits thus obtained information on the transmission power to the base station 12 via the transmitting section 22. Note that the information on the transmission power may be obtained by measuring transmission power of the transmitting section 22 or may be obtained from information on transmission power which the transmitting section 22 receives from the communication control section 27.

The reception power measuring section 38 measures a reception power of a time at which a receiving section 31 receives data with use of an onlyUL-CC. The reception power measuring section 38 transmits information on thus measured reception power to the communication control section 39.

The communication control section 39 has the following functions in addition to the functions of the communication control section 37 shown in FIG. 4. Specifically, the communication control section 39 (i) receives the information on the transmission power from the terminal 11 via the receiving section 31, (ii) receives the information on the reception power from the reception power measuring section 38, and (iii) finds a quality level of the onlyUL-CC on the basis of the transmission power and the reception power. The communication control section 39 determines transmission control for the onlyUL-CC on the basis of the quality level of the onlyUL-CC thus found, and notifies the terminal 11 of the transmission control via the transmitting section 32.

With reference to FIGS. 5 through 18, the following describes how the terminal 11 and the base station 12 configured as above operate. Note that, under a CA connection, the terminal 11 and the base station 12 operate in a similar manner to that shown in FIG. 5.

Figure 22:
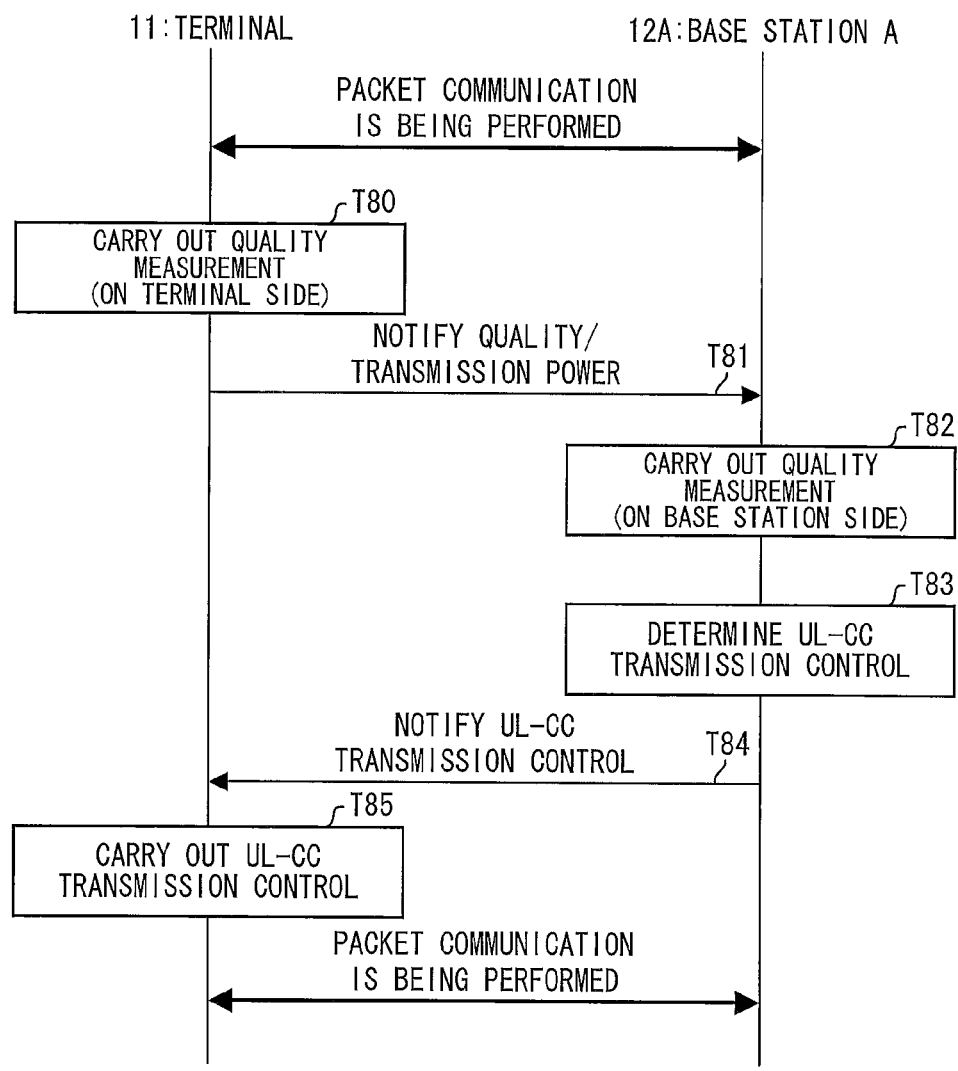
FIG. 22

FIG. 22 is a sequence diagram showing an example of how the terminal 11 and a base station 12A operate in onlyUL-CC transmission control in the wireless communication system 10 of Embodiment 2. According to FIG. 22 which shows an example of a case where a UL communication traffic is high, packet communication is being carried out in a state in which a UL-CC set including an onlyUL-CC is used, as in the above example.

First, the terminal 11 carries out quality measurement (on a terminal side) corresponding to an onlyUL-CC (T80) (see FIG. 22). FIG. 2.3 is a flowchart showing how a process for quality measurement corresponding to an onlyUL-CC is carried out (on the terminal side).

Figure 23:
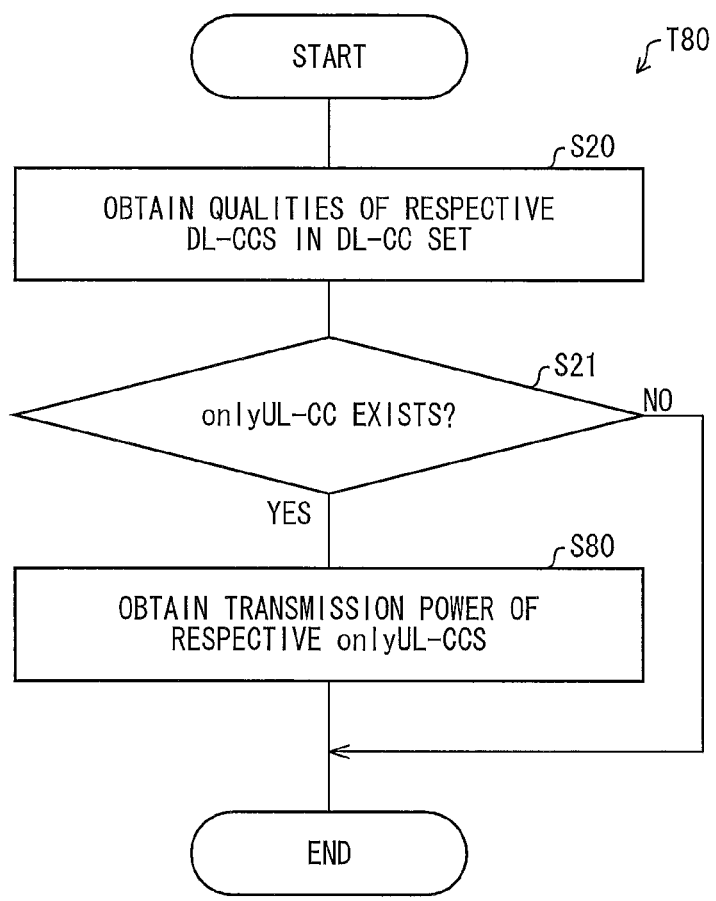
FIG. 23

First, the terminal 11 obtains qualities of respective DL-CCs in a DL-CC set which is currently under communication (S20) (see FIG. 23). In the present example, wireless path loss values (path loss values) of the respective DL-CCs are calculated as the qualities. Note that the qualities may be measured by a conventional method.

Next, the terminal 11 determines whether or not there exists an onlyUL-CC (S21). In a case where the terminal 11 determines that there exists no onlyUL-CC, the process is ended. However, according to the present example, the terminal 11 determines that an onlyUL-CC exists, and therefore obtains transmission power values of respective onlyUL-CCs (S80). The transmission power value is a value which the base station 12A uses to calculate a path loss value of the onlyUL-CC. Then, the process is ended.

Figure 24:
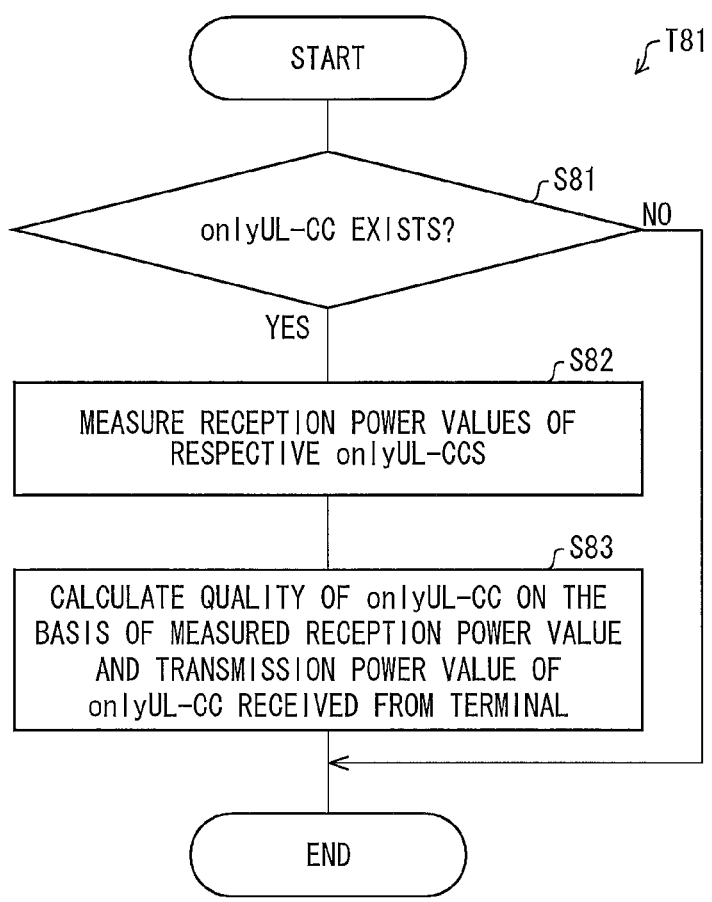
FIG. 24

Next, the terminal 11 uses a UL-CC 21 to notify the base station 12A of thus obtained qualities of the respective DL-CCs (DL-CC 21) in the DL-CC set and thus obtained transmission power value of the onlyUL-CC (UL-CC 11) (T81) (see FIG. 22). The base station 12A carries out quality measurement (on a base station side) of the onlyUL-CC on the basis of the notified transmission power value of the onlyUL-CC (UL-CC 11) (T82). FIG. 24 is a flowchart showing how a process for quality measurement corresponding to the onlyUL-CC is carried out.

First, the base station 12A determines whether or not there exists an onlyUL-CC (S81) (see FIG. 24). In a case where the base station 12A determines that no onlyUL-CC exists, there is no need for any process and therefore the process is ended. However, according to the present example, the base station 12A determines that an onlyUL-CC exists, and therefore measures reception power values of respective onlyUL-CCs (S82). Next, the base station 12A calculates a quality of an onlyUL-CC, on the basis of a reception power value thus measured and the transmission power value received from the terminal 11 (S83). In the present example, a wireless propagation path loss value (path loss value) of the onlyUL-CC is calculated as a quality level. Then, the process is ended.

Thereafter, the operation similar to FIG. 7 is carried out. Specifically, the base station 12A determines transmission control of UL-CCs on the basis of the respective quality levels obtained (T22) (see FIG. 22). Then, the base station 12A notifies the terminal 11 of the transmission control for the UL-CCs with the use of the DL-CC 21 (T23). The terminal 11 carries out the transmission control for the UL-CCs (T24).

Note that the terminal 11 may carry out the quality measurement (on a terminal side) corresponding to an onlyUL-CC (described earlier) (T80 in FIG. 22, FIG. 23) periodically or in accordance with an instruction from the base station 12A. In a case where the terminal 11 carries out the quality measurement corresponding to an onlyUL-CC in accordance with an instruction from the base station 12A, a sequence of making a quality measurement request from the base station 12A is added before step T80 in FIG. 22. In this case, the quality measurement request can include specification of a transmission power value of an onlyUL-CC of which the terminal 11 should notify the base station 12A.

Note that FIGS. 22 through 24 illustrate control of all UL-CCs in a UL-CC set. Alternatively, such control may be replaced with control specialized in an onlyUL-CC. In the present example, the base station 12A carries out only quality measurement of an onlyUL-CC. However, the quality measurement is not limited to an onlyUL-CC. The terminal 11 may alternatively notify the base station 12A of transmission power values of all the UL-CCs so that the base station 12 can carry out quality measurement of all the UL-CCs.

Accordingly, transmission control is carried out in accordance with a quality level based on a wireless propagation path loss of an onlyUL-CC. This allows onlyUL-CC transmission control with higher accuracy.

Figure 25:
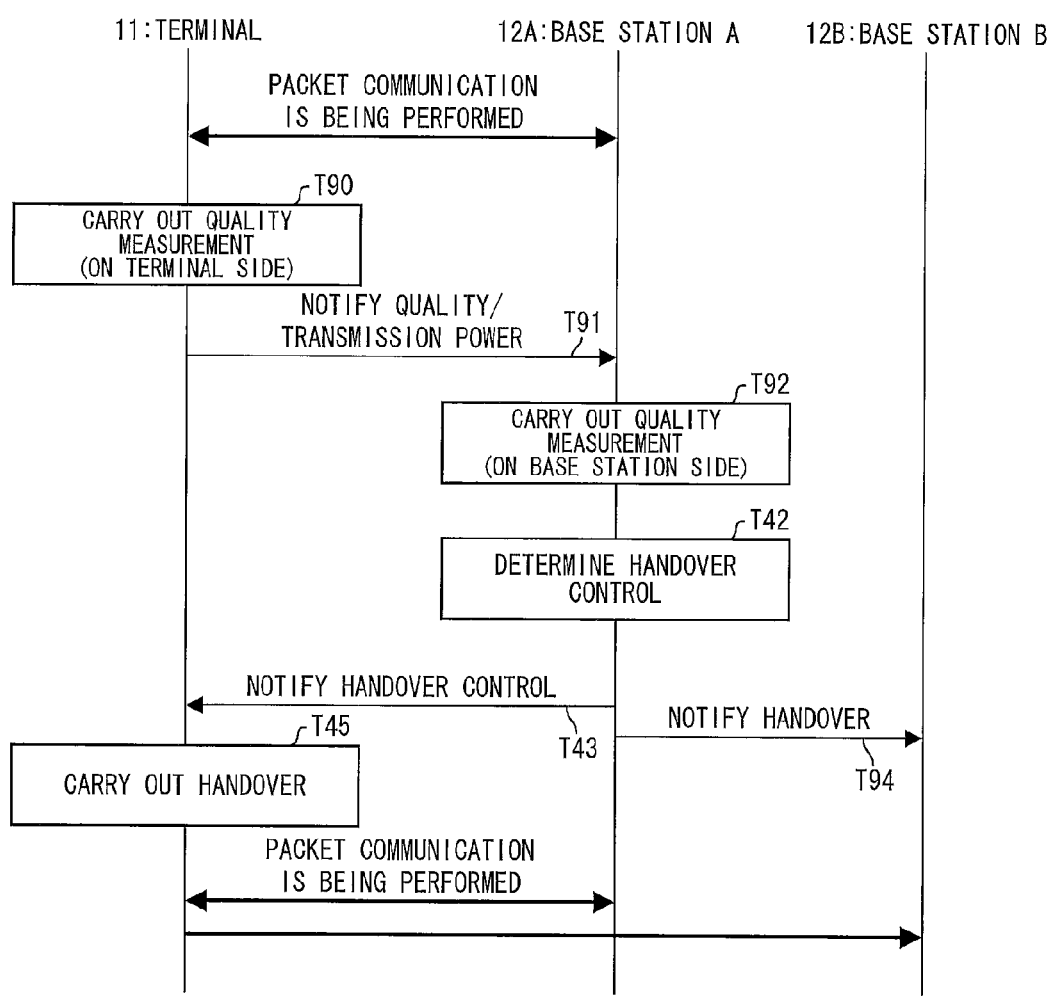
FIG. 25

FIG. 25 is a sequence diagram showing an example in accordance with the present embodiment of how the terminal 11 and the base stations A and B operate under onlyUL-CC handover control. FIG. 25 shows an example in a case where the terminal 11 moves from a point a to a point b in FIG. 19 and a UL communication traffic is high (see FIGS. 5 and 6). In this case, the terminal 11 is carrying out packet communication while using a UL-CC set including an onlyUL-CC.

Figure 26:
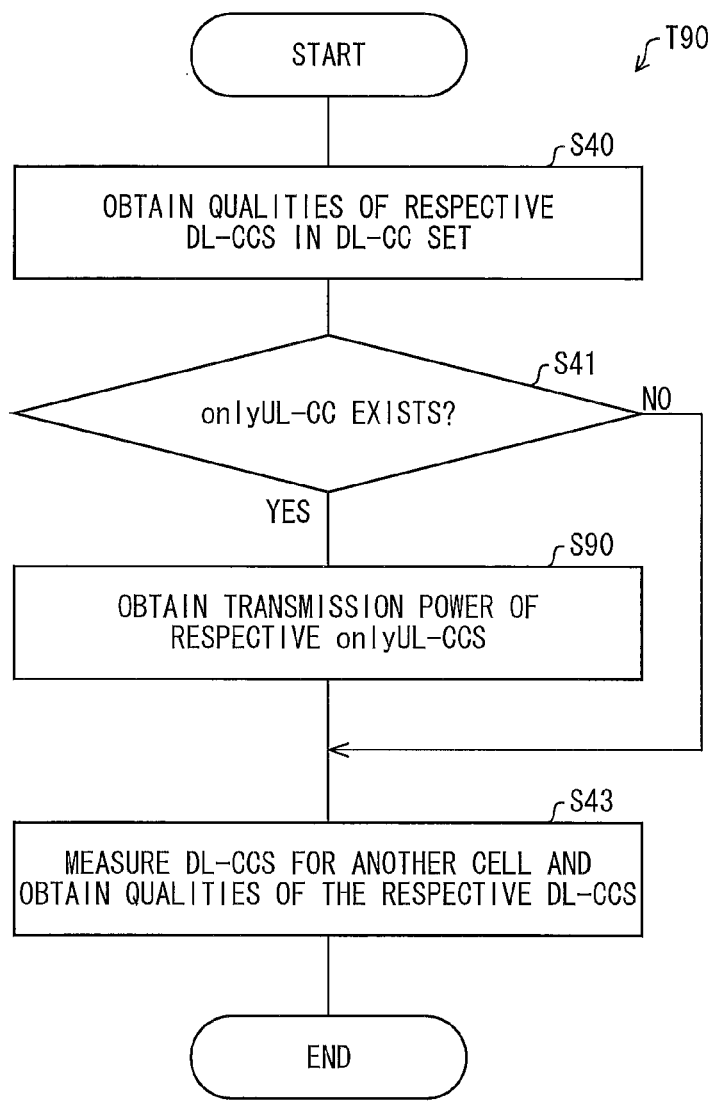
FIG. 26

First, the terminal 11 carries out quality measurement (on the terminal side) corresponding to an onlyUL-CC (T90) (see FIG. 25). FIG. 26 is a flowchart showing how a process for quality measurement (on the terminal side) corresponding to an onlyUL-CC is carried out.

First, the terminal 11 obtains qualities of respective DL-CCs in a DL-CC set which is currently under communication (S40) (see FIG. 26). In the present example, wireless propagation path loss values (path loss values) of the respective DL-CCs are calculated as the qualities. Note that the qualities may be measured by a conventional method.

Next, the terminal 11 determines whether or not there exists an onlyUL-CC (S41). In a case where the terminal 11 determines that there exists no onlyUL-CC, the process proceeds to step S43. However, according to the present example, there exists an onlyUL-CC. Therefore, the terminal 11 obtains a transmission power value of each onlyUL-CC (S90). The transmission power value is a value which the base station 12A uses to calculate a path loss value of the onlyUL-CC. Next, the terminal 11 measures DL-CCs for another cell (the base station 12B) so as to obtain qualities of the respective DL-CCs (S43). Then, the process is ended.

Next, the terminal 11 uses a UL-CC 21 to notify the base station 12A of thus obtained qualities of the respective DL-CCs (DL-CCs 21) in the DL-CC set and the transmission power value of the onlyUL-CC (UL-CC 11) (T91) (see FIG. 25). The base station 12A carries out quality measurement (on the base station side) of the onlyUL-CC on the basis of the transmission power of the onlyUL-CC (UL-CC 11) (T92). Note that the quality measurement (on the base station side) corresponding to the onlyUL-CC is similar to that shown in FIG. 24, and is not explained repeatedly.

Thereafter, similar operations to those shown in FIG. 11 are carried out. Specifically, the base station 12A determines handover control in accordance with the notified qualities (T42) (see FIG. 25). In the case of carrying out handover control, the base station 1 2A uses the DL-CC 21 to notify the terminal 11 of a handover parameter (described above) (T43). Concurrently with this, the base station 12A notifies the base station 12B that the onlyUL-CC (UL-CC 11) will be handed over from the base station 12A to the base station 12B (T44). Meanwhile, in accordance with the notified handover parameter, the terminal 11 hands over only the onlyUL-CC (UL-CC 11) from the base station 12A to the base station 12B (T45).

Note that the terminal 11 may carry out the quality measurement (on the terminal side) corresponding to an onlyUL-CC (described earlier) (T90 in FIG. 25, FIG. 26) periodically or in accordance with an instruction from the base station 12A. In a case where the terminal 11 carries out the quality measurement (on the terminal side) corresponding to an onlyUL-CC in accordance with an instruction from the base station 12A, a sequence of making a quality measurement request from the base station 12 is added before step T90 in FIG. 25. In this case, the quality measurement request can include specification of a transmission power value of the onlyUL-CC of which the terminal 11 should notify the base station 12A. Note also that FIGS. 25 and 26 illustrate control of all UL-CCs in a UL-CC set. Alternatively, such control may be replaced with control specialized in an onlyUL-CC.

Accordingly, handover control is carried out in accordance with a quality level based on a wireless propagation path loss of an onlyUL-CC. This allows onlyUL-CC handover control with higher accuracy.

As described above, the present embodiment is different from the embodiment shown in FIGS. 1 through 12 only in method of measuring a quality level of an onlyUL-CC, and is similar to the embodiment shown in FIGS. 1 through 12 in transmission control and handover control that are carried out in accordance with the quality level. Accordingly, even in a case where a UL-CC becomes an onlyUL-CC during communication as shown in FIG. 17 and FIG. 18, the method of measuring a quality level of an onlyUL-CC can be replaced with the method of the present embodiment.

In the present embodiment, various types of control on an onlyUL-CC are carried out in accordance with a quality level based on wireless propagation path loss of the onlyUL-CC. In this case, the terminal 11 notifies the base station 12 of a transmission power value in order that the base station 12 measures the wireless propagation path loss.

In contrast to this, the following describes how the controls are carried out in a case where the terminal 11 does not notify the base station 12 of the transmission power value. Specifically, in the present example, the base station 12 cannot measure the wireless propagation path loss since the transmission power value at the terminal 11 is unknown. The base station 12 carries out the controls in accordance with an absolute power value which the base station 12 receives.

In a case where a quality level of an onlyUL-CC is monitored only on the basis of an absolute power value, it is difficult to determine whether the terminal 11 is close to or far from the base station 12, for the following reason.

Generally, the base station 12 carries out transmission control so that a reception level (absolute power value) of a UL-CC becomes a certain constant level. More specifically, in a case where a reception level (absolute power value) of a UL-CC becomes high, the base station 12 controls the terminal 11 so as to lower a transmission level. Meanwhile, in a case where the reception level becomes low, the base station 12 controls the terminal 11 so as to increase the transmission level. This control is carried out periodically or carried out in response to a transmission control request from the base station 12. This transmission control causes the reception level (absolute power value) to be kept at a substantially constant level, even in a case where the terminal 11 is moving away from the base station 12. It is therefore difficult to judge that the terminal 11 is far from the base station 12.

This is considered to be a cause of a phenomenon in which (i) the base station 12 suddenly becomes incapable of receiving an onlyUL-CC or (ii) the terminal 11 uselessly continues emitting radio waves for an onlyUL-CC although the terminal 11 has moved away from the base station 12 and the onlyUL-CC does not reach the base station 12. The following example describes control carried out for the purpose of preventing such a phenomenon.

As described above, in a case where the terminal 11 has moved away from the base station 12, the base station 12 requests the terminal 11 to increase a transmission level. However, in a case where the terminal 11 is already carrying out transmission at its maximum power, the terminal 11 cannot increase the transmission power any more in response to the request from the base station 12. As such, the base station 12 can detect that a reception level (absolute power value) does not increase in spite of the request to the terminal 11 for an increase in transmission level.

In a case where the base station 12 makes the above detection, the base station 12 judges that the terminal 11 has moved away from the base station 12, and carries out a handover of the onlyUL-CC or stop the transmission. In a case where the handover is to be carried out, nearby base stations 12 attempt reception of the onlyUL-CC from the terminal 11 so as to measure a quality level (absolute power value) as soon as the base station 12 makes the above detection. Then, a handover to a base station 12 that obtains a good quality level is carried out. In a case where there is no base station 12 that obtains a good quality level or in a case where no base station 12 that can receive the onlyUL-CC exists around the terminal 11 (for example, in a case where there exists no base station 12 which supports a band used for the onlyUL-CC), the transmission of the onlyUL-CC is stopped immediately.

According to the above control, it is necessary to carry out handover control immediately after the detection. However, there can be timings at which it is difficult to carry out the handover. In such a case, the base station 12 may always carry out such control as to stop transmission of the onlyUL-CC in a case where the above detection is made.

The terminal 11 may attempt an onlyUL-CC connection in a case where the base station 12, for example, receives from the terminal 11 a report concerning a measurement result of a quality level of another cell and judges, on the basis of the report, that the stopped onlyUL-CC has become available again or another onlyUL-CC is available. In this case, an initial transmission power value can be a power value immediately before the stop of the last transmission or can be a power value smaller by a predetermined value than the power value immediately before the stop of the last transmission. Alternatively, the initial transmission power value may be a power value given by the base station 12.

The above control makes it possible to prevent the aforementioned phenomenon. Note that onlyUL-CC transmission stop control and onlyUL-CC reconnection control that are described above can be carried out in a similar manner as shown in FIGS. 1 through 18 with the use of a quality level of a DL-CC corresponding to an onlyUL-CC.

[Embodiment 3]

Figure 27:
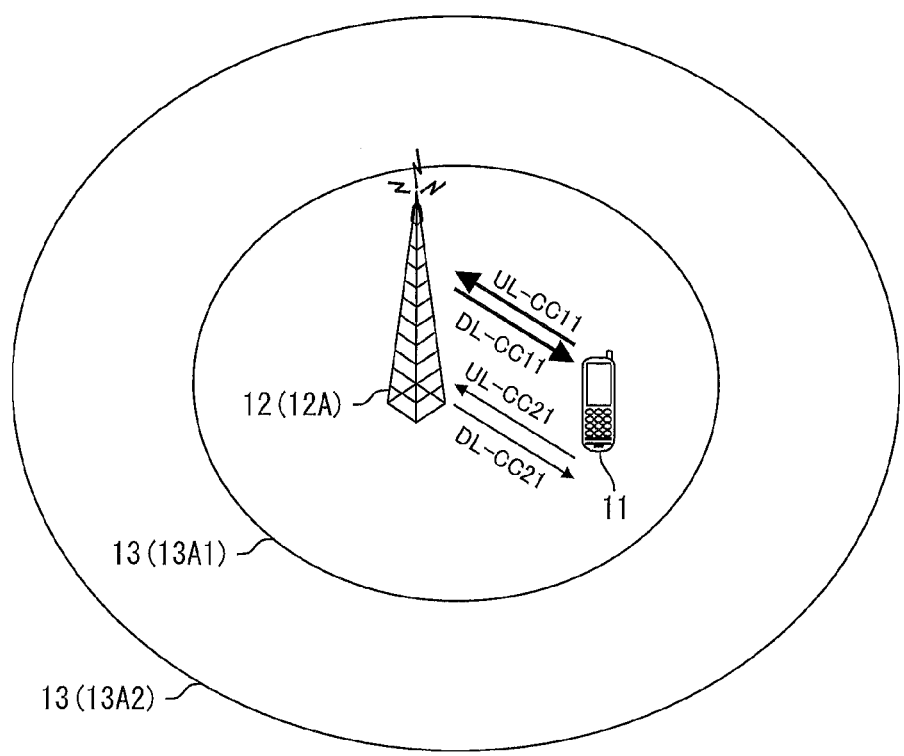
FIG. 27

Next, another embodiment of the present invention is described below with reference to FIGS. 27 through 29. FIG. 27 is a view schematically showing a wireless communication system of the present embodiment.

According to the above embodiments, there exists an onlyUL-CC, and transmission control and the like of the onlyUL-CC are carried out by managing a quality of the onlyUL-CC. Meanwhile, the present embodiment carries out control that allows no onlyUL-CC to exist. For example, in a case where addition of an onlyUL-CC is desired, control that adds not only the UL-CC but also a DL-CC corresponding to the UL-CC is always carried out. Note that members and processes that are similar to those of the above embodiments are given identical reference numerals, and are not explained repeatedly.

FIG. 27 shows a state that is shifted from the state shown in (a) of FIG. 17 and in which state one of the two UL-CCs currently under communication in the band FB2 is replaced with a UL-CC in the band FB1. In the example shown in (b) of FIG. 17, the UL-CC in the band FB1 is an onlyUL-CC. Accordingly, in control carried out in the example shown in (b) of FIG. 17, a DL-CC corresponding to the UL-CC is monitored. Meanwhile, in control carried out in the present example, a DL-CC corresponding to the UL-CC in the band FB1 is also added to a DL-CC set. Note that a wireless communication system 10 of the present embodiment has a similar configuration to the wireless communication system 10 shown in FIGS. 1 and 2 and that the terminal 11 and the base station 12 have similar configurations to the terminal 11 and the base station 12 shown in FIGS. 3 and 4, respectively.

Figure 28:
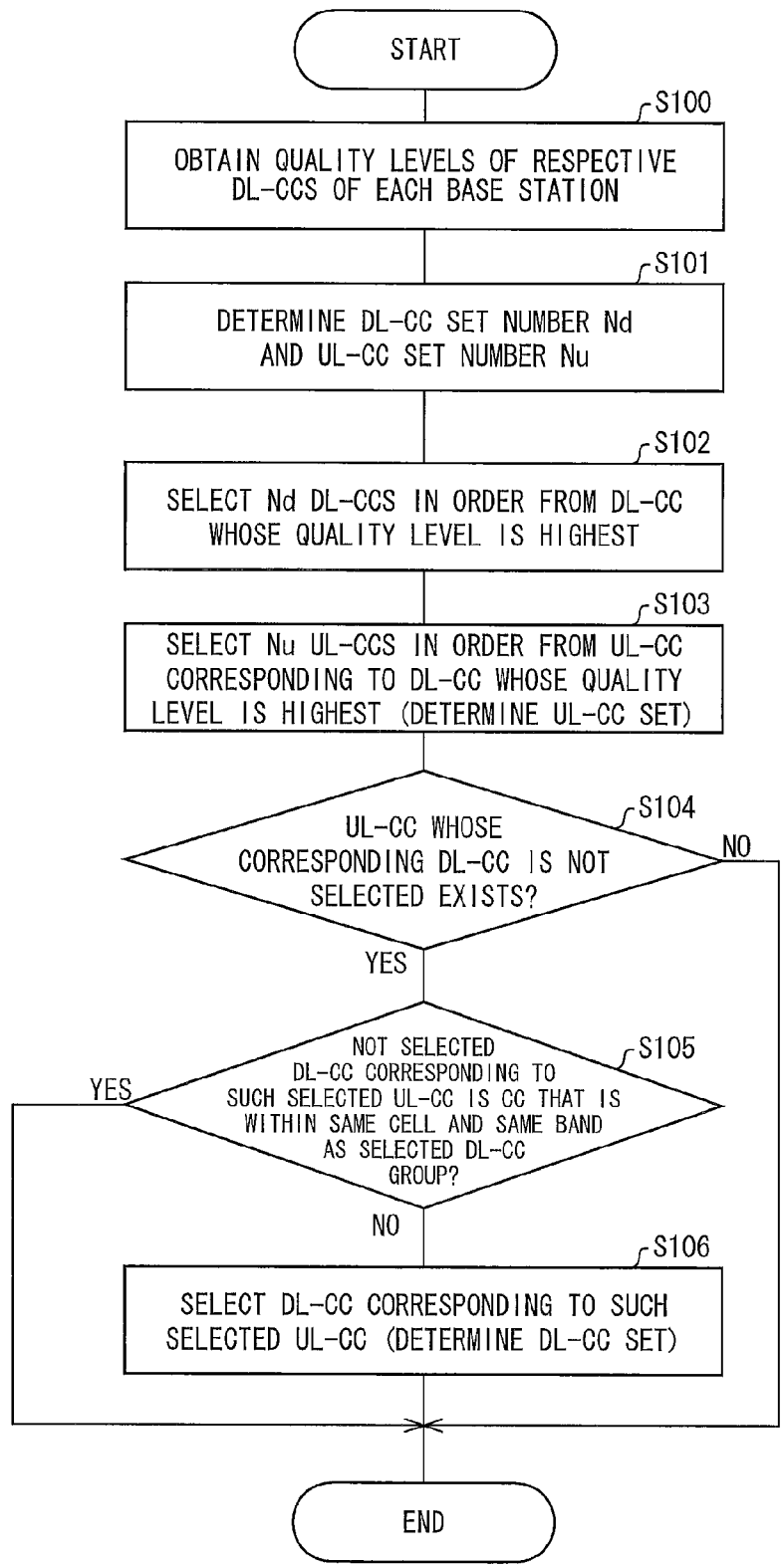
FIG. 28

FIG. 28 is a flowchart showing an example of how a process for determining a CA set is carried out. This process corresponds to step T17 in the CA connection shown in FIG. 5.

First, the base station 12A obtains quality levels of respective DL-CCs of each base station 12, which quality levels having been notified from the terminal 11 (S100) (see FIG. 28). Next, the base station 12A determines a DL-CC set number Nd and a UL-CC set number Nu in accordance with a requested communication traffic, a communication traffic of a base station 12, and the like (S101). Subsequently, the base station 12A selects Nd DL-CCs in the order from a DL-CC whose quality level is the highest (S102). Note that in step S102, in a case where a selected DL-CC has a poor quality level, the base station 12A may additionally carry out control for excluding such a selected DL-CC from the DL-CC set. In this case, the number of DL-CC sets becomes smaller than Nd.

Then, the base station 12A selects Nu UL-CCs in the order from a UL-CC corresponding to the DL-CC whose quality level is the highest (S103). According to this, a UL-CC set is determined. Note that as in the case of the DL-CC set, in step S103, in a case where a selected DL-CC has a poor quality level, the base station 12A may additionally carry out control for excluding a UL-CC corresponding to such a selected UL-CC from the UL-CC set. In this case, the number of UL-CC sets becomes smaller than Nu.

Next, the base station 12 determines whether or not there exists a selected UL-CC whose corresponding DL-CC is not selected (S104). Basically, in a case where Nu>Nd, there exists such a UL-CC whose corresponding DL-CC is not selected. Note that a DL-CC that is not in the same band or in the same cell as the UL-CC is not regarded as a DL-CC corresponding to the UL-CC. In a case where the base station 12 determines in step S104 that there exists no UL-CC whose corresponding DL-CC is not selected (basically in a case where Nu≤Nd), a plurality of DL-CCs that are currently selected are determined as a DL-CC set. Then, the process is ended.

Meanwhile, in a case where the base station 12 determines that there exists a UL-CC whose corresponding DL-CC is not selected (basically in a case where Nu>Nd), the base station 12 determines whether or not the DL-CC corresponding to the UL-CC whose corresponding DL-CC is not selected is a CC that is in the same cell and the same band as the DL-CCs that are currently selected (S105). That is, the base station 12 determines whether or not the UL-CC whose corresponding DL-CC is not selected is an onlyUL-CC. In a case where the base station 12 determines that the DL-CC corresponding to the UL-CC whose corresponding DL-CC is not selected is a CC that is in the same cell and the same band as the DL-CCs that are currently selected, the DL-CCs that are currently selected are determined as a DL-CC set. Then, the process is ended. Meanwhile, in a case where the DL-CC corresponding to the UL-CC whose corresponding DL-CC is not selected is not a CC that is in the same cell or in the same band as the DL-CCs that are currently selected, DL-CCs that correspond to respective UL-CCs and that are in the same cell and the same band as the UL-CCs are also additionally selected. Thus, the DL-CC set is determined (S106). Then, the process is ended.

Accordingly, a CA set that includes no onlyUL-CC is determined. This eliminates the need for special transmission control for an onlyUL-CC, thereby making it possible to carry out conventional transmission control. Further, the base station 12 can assess a communication quality of an allocated UL-CC with high accuracy, and the communication terminal 11 can control uplink transmission in the UL-CC with high accuracy.

In the example of FIG. 28, in a case where an onlyUL-CC is selected, a DL-CC for controlling the onlyUL-CC is added. Accordingly, the DL-CC set number becomes larger than the DL-CC set number Nd that has been determined in accordance with a requested communication traffic, a communication traffic, and the like of the base station 12. That is, control is carried out for adding an additional DL-CC in consideration of not only use for communication but also use for measurement of a communication quality. Needless to say, even a DL-CC for measurement of a communication quality can be used in a usual manner for data transmission.

In the example of FIG. 28, the DL-CC set number and the UL-CC set number are first determined in accordance with a quality level, and then, in a case where there exists an onlyUL-CC, control for adding a DL-CC corresponding to the onlyUL-CC is carried out. Alternatively, it is also possible to flexibly determine the DL-CC set number and the UL-CC set number by concurrently (i) obtaining a quality level and (ii) judging whether or not there exists an onlyUL-CC. That is, it is also possible to carry out such control that eliminates an onlyUL-CC while minimizing the DL-CC set number.

In the example of FIG. 28, the DL-CCs are sequentially selected in the order from a DL-CC whose quality level is the highest. Note, however, that it is also possible to sequentially select the DL-CCs (or UL-CCs) in the order from a DL-CC (or a UL-CC) that has a largest amount of spare radio resources. Alternatively, it is also possible to sequentially select the DL-CCs (or UL-CCs) in the order from an optimum DL-CC (or UL-CC) by concurrently (i) obtaining a quality level and (ii) judging whether or not there is any spare radio resource.

Although the above description has dealt with the process for determining a CA set, an onlyUL-CC can occur also in handover control as described above. Also in this case, it is possible to carry out control for adding, to a DL-CC set, a DL-CC corresponding to the onlyUL-CC.

Figure 29:
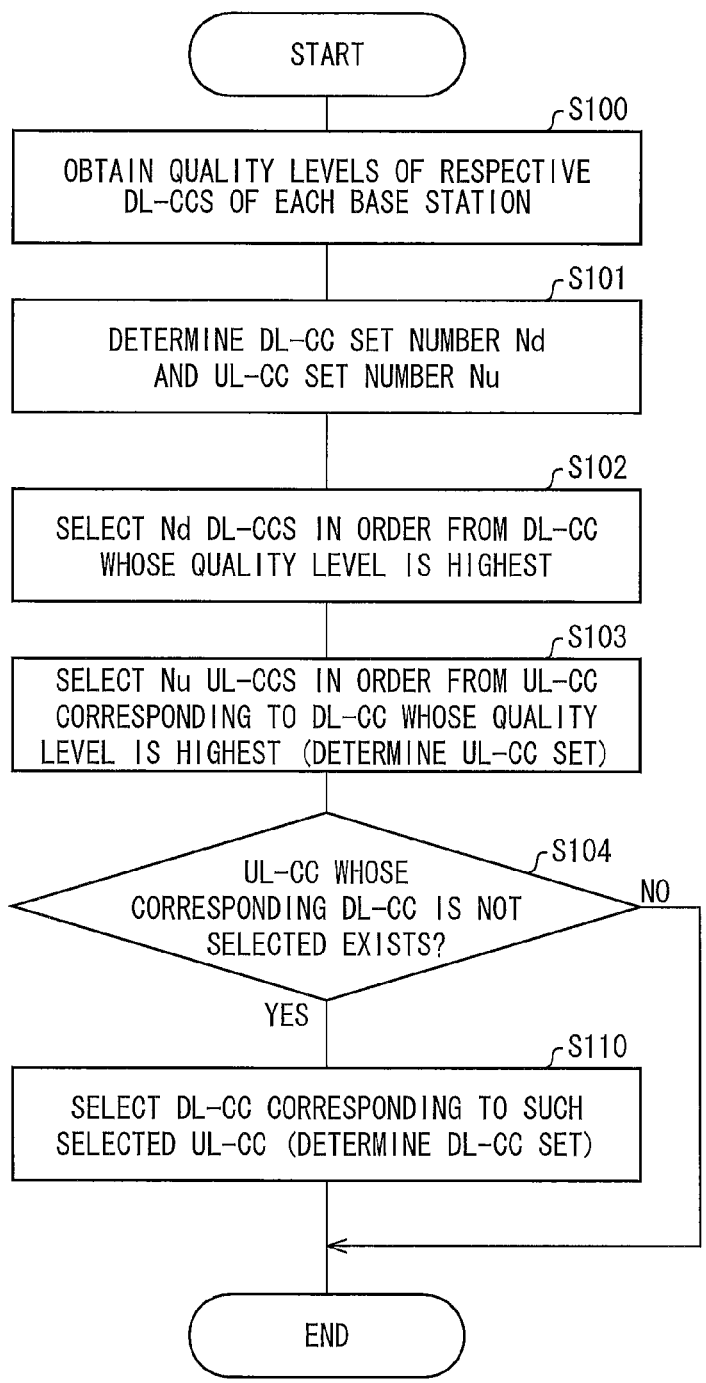
FIG. 29

FIG. 29 is a flowchart showing another example of how a process for determining a CA set is carried out. The example of FIG. 29 is different from the example of FIG. 28 in the processes in step S104 and the subsequent steps, and is similar to the example of FIG. 28 in the other processes.

In a case where the base station 12 determines in step S104 that there exists no UL-CC whose corresponding DL-CC is not selected (basically in a case where Nu Nd), the DL-CCs that are currently selected are determined as a DL-CC set. Then, the process is ended. Meanwhile, in a case where the base station 12 determines in step S104 that there exists a UL-CC whose corresponding DL-CC is not selected (basically in a case where Nu>Nd), a DL-CC corresponding to the UL-CC is also selected and a DL-CC set including this DL-CC is determined (S110). Then, the process is ended.

In the example of FIG. 28, in a case where an onlyUL-CC is selected, a control for adding, to a DL-CC set, a DL-CC corresponding to the onlyUL-CC is always carried out. Meanwhile, in the example of FIG. 29, control for adding, to a DL-CC set, not only a DL-CC corresponding to an onlyUL-CC but also DL-CCs respectively corresponding to all UL-CCs is carried out. In this case, the DL-CC set number is always equal to or larger than the UL-CC set number. Such control clarifies DL-CCs for transmission control of respective UL-CCs, thereby making the control easier. Further, the transmission control can be replaced with conventional transmission control.

The present invention is not limited to the description of the embodiments above, but may be altered by a skilled person within the scope of the claims. An embodiment based on a proper combination of technical means disclosed in different embodiments is encompassed in the technical scope of the present invention.

For example, in the above embodiments, the bands FB1 and FB2 that are not continuous with each other are used, but instead bands that are continuous with each other may be used or bands that partially overlap each other may be used. Further, in the above embodiment, the two bands FB1 and FB2 are used, but instead three or more bands may be used. Even in such a case, a UL-CC in any of the bands is highly likely to have a frequency closer to a frequency of a DL-CC in the same band than to a frequency of a DL-CC in another band. As such, application of the present invention makes it possible to produce the above-mentioned effects.

Note that the present invention can also be stated as follows.

The base station may allocate, to the communication terminal, the uplink sub-band corresponding to the downlink sub-band, in the order from the downlink sub-band whose value of the communication quality is the largest, the communication quality being measured by the communication terminal. In this case, it is highly possible that uplink transmission in the uplink sub-band that has been allocated is favorably carried out. Note that the uplink sub-band can be allocated in the order from a frequency band that has a largest amount of spare resources.

In the wireless communication system of the present invention, the monitor downlink sub-band whose communication quality is measured by the quality measurement means of the communication terminal may be determined by the band allocation means of the base station. In this case, the quality measurement means of the communication terminal can measure a communication quality of the monitor downlink sub-band in addition to the communication quality of the downlink sub-band that has been allocated. Accordingly, the base station and the communication terminal do not need to have special means for the only-uplink sub-band. Note that the communication terminal may determine the monitor downlink sub-band.

Because the monitor downlink sub-band is not included in the downlink sub-band that has been allocated, the monitor downlink sub-band is not used in downlink transmission from the base station to the communication terminal. Therefore, there is possibility that the quality measurement means of the communication terminal takes a long time for measuring a communication quality of the monitor downlink sub-band.

On this account, in the wireless communication system of the present invention, the communication control means of the communication terminal may keep physical layer synchronization of the monitor downlink sub-band. In this case, the quality measurement means of the communication terminal can rapidly measure the communication quality of the monitor downlink sub-band. This makes it possible to carry out dynamic communication control of the only-uplink sub-band, in accordance with the communication quality.

The wireless communication system of the present invention may be arranged such that: the quality measurement means of the communication terminal further measures a communication quality of a downlink sub-band of another base station that is different from the base station; and the communication control determination means of the base station determines whether or not to carry out a handover of the uplink sub-band corresponding to the downlink sub-band, based on a comparison between (a) the communication quality of the downlink sub-band of the base station and (b) the communication quality of the downlink sub-band of the another base station, the communication qualities having been measured by the quality measurement means of the communication terminal. In this case, no special handover control is required even when there exists the only-uplink sub-band.

Note that the comparison may be carried out by the quality measurement means of the communication terminal or alternatively by the communication control determination means of the base station. In a case where the quality measurement means of the communication terminal carries out the comparison, the quality measurement means notifies a result of the comparison to the base station. At this time, the quality measurement means of the communication terminal may notify the base station of a result of the comparison concerning the downlink sub-band that has been allocated and a result of the comparison concerning the monitor downlink sub-band.

In a case where the communication quality of the downlink sub-band of the base station is substantially equal to the communication quality of the downlink sub-band of the another base station, there is possibility that the communication quality of the base station and the communication quality of the another station each fluctuatingly becomes a favorable state due to variation in measurement of the communication quality. In this case, a handover frequently occurs.

In view of this, in the wireless communication system of the present invention, in the comparison, a value obtained by adding a predetermined threshold to a value of the communication quality of the downlink sub-band of the base station may be compared with a value of the communication quality of the downlink sub-band of the another base station. The use of the threshold value makes it possible to prevent a frequent handover from occurring due to variation in measurement result of the communication quality.

Further, the predetermined threshold value for the downlink sub-area that has been allocated may be different from the predetermined threshold value for the monitor downlink sub-band. In this case, by use of such different threshold values respectively for the monitor downlink sub-band and the downlink sub-band that has been allocated, it becomes possible to deal with a case where variation in measured result of the communication quality of the monitor downlink sub-band is different from variation in measured result of the communication quality of the downlink sub-band that has been allocated.

The wireless communication system of the present invention may be arranged such that: the quality measurement means of the communication terminal further measures a communication quality of a downlink sub-band of another base station that is different from the base station; and the communication control determination means of the base station determines whether or not to carry out a handover of the only-uplink sub-band, based on comparison between (a) a communication quality of the only-uplink sub-band of the base station and (b) the communication quality of the downlink sub-band of the another base station, the communication quality of the only-uplink sub-band having been measured by the quality measurement means of the base station, the communication quality of the downlink sub-band having been measured by the quality measurement means of the communication terminal.

In this case, handover control is determined by use of thus directly obtained communication quality of the only-uplink sub-band. This makes it possible to carry out the handover control with accuracy.

In the wireless communication system of the present invention, preferably, the communication terminal further includes transmission power obtaining means that obtains a transmission power for the uplink sub-band; and the quality measurement means of the base station obtains the communication quality of the only-uplink sub-band, from the reception power that the quality measurement means of the base station has measured and the transmission power that has been obtained by the transmission power obtaining means of the communication terminal.

In this case, the communication quality is obtained by use of not only a reception power of the only-uplink sub-band but also a transmission power of the only-uplink sub-band. This makes it possible to obtain the communication quality with accuracy. This further makes it possible to carry out communication control of the only-uplink sub-band with higher accuracy. Note that the transmission power obtaining means of the communication terminal may obtain the transmission power for the only-uplink sub-band by measurement or alternatively, may obtain the transmission power from an instruction regarding the transmission power which instruction is directed to a communication unit in the communication terminal.

Note that any base station employed in the wireless communication system configured as described above can provide effects that are similar to the above-described effects. Further, any communication terminal employed in the wireless communication system configured as described above can provide effects that are similar to the above-described effects.

Note that each means in the wireless communication system can be realized by a computer by use of a control program. Further, the control program can be executed on any computer by storing the control program in a computer-readable storage medium.

Finally, the blocks of the wireless communication system 10, in particular, the control section (communication control means, quality measurement means, transmission power obtaining means) 24 and a control section (band allocation means, communication control determination means, quality measurement means) 34 may be realized by way of hardware or software as executed by a CPU as follows:

The wireless communication system 10 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the wireless communication system 10 a computer-readable storage medium containing control program code (executable program, intermediate code program, or source program) for the wireless communication system 10, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The wireless communication system 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal which is embedded in a carrier wave and in which computer data signal the program code is embodied electronically.

INDUSTRIAL APPLICABILITY

According to the subject invention, it becomes possible to carry out, with accuracy, communication control on an only-uplink sub-band by (i) allocating an uplink sub-band and a downlink sub-band so that no only-uplink sub-band is produced or (ii) accurately obtaining a communication quality of the only-uplink sub-band. Therefore, the present invention is applicable to any wireless communication system in which a base station allocates an uplink sub-band and a downlink sub-band to a communication terminal.

REFERENCE SIGNS LIST 10 wireless communication system
11 terminal (communication terminal)
12 base station
13 cell
14 core network device
20 receiver antenna
21 receiving section (communication section)
22 transmitting section (communication section)
23 transmitter antenna
24 control section
25 packet communication requesting section
26 quality measuring section (quality measurement means)
27 communication control section (communication control means)
28 transmission power obtaining section (transmission power obtaining means)
30 receiver antenna
31 receiving section (communication section)
32 transmitting section (communication section)

33 transmitter antenna
34 control section
35 CA candidate determining section
36 CA set determining section (band allocation means)
37 communication control section (communication control determination means)
38 reception power measuring section (quality measurement means)
39 communication control section (communication control determination means, quality measurement means)
FB1, FB2 frequency band

The invention claimed is:

1. A wireless communication system in which wireless communication between a base station and a communication terminal is carried out by use of a plurality of frequency bands, wherein:
  the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station;
  the base station includes band allocation means that allocates, to the communication terminal, the downlink sub-band and the uplink sub-band in the plurality of frequency bands;
  the communication terminal includes quality measurement means that measures a communication quality of the downlink sub-band that has been allocated by the band allocation means of the base station;
  the base station includes communication control determination means that determines, in accordance with the communication quality of the downlink sub-band, communication control of the uplink sub-band that has been allocated by the band allocation means of the base station, the communication quality having been measured by the quality measurement means of the communication terminal, the uplink sub-band that has been allocated corresponding to the downlink sub-band that has been allocated;
  the communication terminal includes communication control means that controls, in accordance with the communication control of the uplink sub-band that has been allocated, the uplink transmission in the uplink sub-band that has been allocated, the communication control having been determined by the communication control determination means of the base station; and
  in a case where there exists a frequency band that includes (i) the uplink sub-band having been allocated to the communication terminal by the band allocation means of the base station but (ii) no downlink sub-band that has been allocated to the communication terminal by the band allocation means of the base station,
    (a) the quality measurement means of the communication terminal further measures, as a communication quality of a monitor downlink sub-band, a communication quality of a downlink sub-band that has not been allocated in the frequency band of the case, and
    (b) the communication control determination means of the base station determines, in accordance with the communication quality of the monitor downlink sub-band, communication control of an only-uplink sub-band that is the uplink sub-band that has been allocated in the frequency band of the case, the communication quality having been measured by the quality measurement means of the communication terminal, wherein:
    the quality measurement means of the communication terminal further measures a communication quality of a downlink sub-band of another base station that is different from the base station; and
    the communication control determination means of the base station determines whether or not to carry out a handover of the uplink sub-band corresponding to the downlink sub-band, based on a comparison between (a) the communication quality of the downlink sub-band of the base station and (b) the communication quality of the downlink sub-band of the another base station, the communication qualities having been measured by the quality measurement means of the communication terminal.

2. The wireless communication system as set forth in claim 1 wherein the quality measurement means of the communication teniinal carries out the comparison.

3. The wireless communication system as set forth in claim 2, wherein the quality measurement means of the communication terminal notifies the base station of a result of the comparison concerning the downlink sub-band that has been allocated and a result of the comparison concerning the monitor downlink sub-band.

4. The wireless communication system as set forth in claim 1, wherein:
  in the comparison, a value obtained by adding a predetermined threshold to a value of the communication quality of the downlink sub-band of the base station is compared with a value of the communication quality of the downlink sub-band of the another base station; and
  the predetermined threshold is different for each of the downlink sub-band that has been allocated and the monitor downlink sub-band.

5. A wireless communication system in which wireless communication between a base station and a communication terminal is carried out by use of a plurality of frequency bands, wherein:
  the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station;
  the base station includes band allocation means that allocates, to the communication terminal, the downlink sub-band and the uplink sub-band in the plurality of frequency bands;
  the communication terminal includes quality measurement means that measures a communication quality of the downlink sub-band that has been allocated by the band allocation means of the base station;
  the base station includes communication control determination means that determines, in accordance with the communication quality of the downlink sub-band, communication control of the uplink sub-band that has been allocated by the band allocation means of the base station, the communication quality having been measured by the quality measurement means of the communication terminal, the uplink sub-band that has been allocated corresponding to the downlink sub-band that has been allocated;
  the communication terminal includes communication control means that controls, in accordance with the communication control of the uplink sub-band that has been allocated, the uplink transmission in the uplink sub-band that has been allocated, the communication control having been determined by the communication control determination means of the base station;

the base station includes quality measurement means that
(i) measures a reception power in the uplink sub-band
and (ii) obtains a communication quality of the uplink
sub-band from the reception power thus measured; and in a case where there exists a frequency band that includes
(i) the uplink sub-band having been allocated to the
communication terminal by the band allocation means
of the base station but (ii) no downlink sub-band that has
been allocated to the communication terminal by the
band allocation means of the base station, the communication control determination means of the
base station determines, in accordance with the communication quality having been obtained by the quality measurement means, communication control of an only-uplink sub-band that is the uplink sub-band in the frequency band of the case, and wherein:

the quality measurement means of the communication terminal further measures a communication quality of a downlink sub-band of another base station that is different from the base station; and the communication control determination means of the base station determines whether or not to carry out a handover of the only-uplink sub-band, based on comparison between (a) a communication quality of the only-uplink sub-band of the base station and (b) the communication quality of the downlink sub-band of the another base station, the communication quality of the only-uplink sub-band having been measured by the quality measurement means of the base station, the communication quality of the downlink sub-band having been measured by the quality measurement means of the communication terminal.

6. A wireless communication system in which wireless communication between a base station and a communication terminal is carried out by use of a plurality of frequency bands, wherein:

the plurality of frequency bands each include (i) a downlink sub-band that is a frequency band for use in downlink transmission from the base station to the communication terminal and (ii) an uplink sub-band that is a frequency band for use in uplink transmission from the communication terminal to the base station;

the base station includes band allocation means that allocates, to the communication terminal, the downlink sub-band and the uplink sub-band in the plurality of frequency bands;

the communication terminal includes quality measurement means that measures a communication quality of the downlink sub-band that has been allocated by the band allocation means of the base station;

the base station includes communication control determination means that determines, in accordance with the communication quality of the downlink sub-band, communication control of the uplink sub-band that has been allocated by the band allocation means of the base station, the communication quality having been measured by the quality measurement means of the communication terminal, the uplink sub-band that has been allocated corresponding to the downlink sub-band that has been allocated;

the communication terminal includes communication control means that controls, in accordance with the communication control of the uplink sub-band that has been allocated, the uplink transmission in the uplink sub-band that has been allocated, the communication control having been determined by the communication control determination means of the base station;

the base station includes quality measurement means that
(i) measures a reception power in the uplink sub-band
and (ii) obtains a communication quality of the uplink
sub-band from the reception power thus measured; and in a case where there exists a frequency band that includes
(i) the uplink sub-band having been allocated to the
communication terminal by the band allocation means
of the base station but (ii) no downlink sub-band that has
been allocated to the communication terminal by the
band allocation means of the base station, the communication control determination means of the base station determines, in accordance with the communication quality having been obtained by the quality measurement means, communication control of an only-uplink sub-band that is the uplink sub-band in the frequency band of the case, and wherein:

the communication terminal further includes transmission power obtaining means that obtains a transmission power for the uplink sub-band; and the quality measurement means of the base station obtains the communication quality of the only-uplink sub-band, from the reception power that the quality measurement means of the base station has measured and the transmission power that has been obtained by the transmission power obtaining means of the communication terminal.

7. A wireless communication system in which wireless communication between a base station and a communication terminal is carried out by use of a plurality of frequency bands, wherein:

the plurality of frequency bands each include (i) a downlink sub-band that is a frequency band for use in downlink transmission from the base station to the communication terminal and (ii) an uplink sub-band that is a frequency band for use in uplink transmission from the communication tenninal to the base station;

the base station includes band allocation means that allocates, to the communication terminal, the downlink sub-band and the uplink sub-band in the plurality of frequency bands;

the communication terminal includes quality measurement means that measures a communication quality of the downlink sub-band that has been allocated by the band allocation means of the base station;

the base station includes communication control determination means that determines, in accordance with the communication quality of the downlink sub-band, communication control of the uplink sub-band that has been allocated by the band allocation means of the base station, the communication quality having been measured by the quality measurement means of the communication terminal, the uplink sub-band that has been allocated corresponding to the downlink sub-band that has been allocated;

the communication terminal includes communication control means that controls, in accordance with the communication control of the uplink sub-band that has been allocated, the uplink transmission in the uplink sub-band that has been allocated, the communication control having been determined by the communication control determination means of the base station; and in a case where there exists a frequency band that includes
(i) the uplink sub-band having been allocated to the
communication terminal by the band allocation means
of the base station but (ii) no downlink sub-band that has
been allocated to the communication terminal by the
band allocation means of the base station, (a) the quality measurement means of the communication terminal further measures, as a communication quality of a monitor downlink sub-band, a communication quality of a downlink sub-band that has not been allocated in the frequency band of the case, and (b) the communication control determination means of the base station determines, in accordance with the communication quality of the monitor downlink sub-band, communication control of an only-uplink sub-band that is the uplink sub-band that has been allocated in the frequency band of the case, the communication quality having been measured by the quality measurement means of the communication terminal, wherein the band allocation means of the base station allocates, to the communication terminal, the uplink sub-band corresponding to the downlink sub-band, in the order from the downlink sub-band whose value of the communication quality is the largest, the communication quality having been measured by the quality measurement means of the communication terminal.

* * * * *